US008204641B2

(12) United States Patent
Kawakami et al.

(10) Patent No.: US 8,204,641 B2
(45) Date of Patent: Jun. 19, 2012

(54) TRACTION MOTOR CONTROL APPARATUS FOR VEHICLE

(75) Inventors: Eiichiro Kawakami, Chiryu (JP); Shigenori Mori, Handa (JP)

(73) Assignee: Denso Corporation, Kariya (JP)

( * ) Notice: Subject to any disclaimer, the term of this patent is extended or adjusted under 35 U.S.C. 154(b) by 181 days.

(21) Appl. No.: 12/846,068

(22) Filed: Jul. 29, 2010

(65) Prior Publication Data

US 2011/0029178 A1    Feb. 3, 2011

(30) Foreign Application Priority Data

Jul. 31, 2009    (JP) .................................. 2009-179930

(51) Int. Cl.
*B60L 3/00* (2006.01)
*F02P 5/00* (2006.01)
*F02D 41/34* (2006.01)

(52) U.S. Cl. .. 701/22; 701/21; 123/406.58; 123/406.12; 123/612

(58) Field of Classification Search .......................... None
See application file for complete search history.

(56) References Cited

U.S. PATENT DOCUMENTS

| 5,532,929 | A * | 7/1996 | Hattori et al. ................. 701/110 |
| 5,896,283 | A | 4/1999 | Usami |
| 5,908,463 | A * | 6/1999 | Akazaki et al. ............... 701/104 |
| 6,801,840 | B2 | 10/2004 | Kodama et al. ................. 701/21 |
| 7,957,875 | B2 * | 6/2011 | Antanaitis et al. ............. 701/70 |
| 2005/0125124 | A1 * | 6/2005 | Nagase et al. .................. 701/41 |
| 2006/0033643 | A1 | 2/2006 | Okamuro et al. |
| 2006/0042074 | A1 | 3/2006 | Stork et al. |
| 2006/0184258 | A1 * | 8/2006 | Matsuda et al. ................ 700/56 |
| 2007/0044548 | A1 | 3/2007 | Ishizuka et al. |
| 2008/0265831 | A1 | 10/2008 | Imai et al. |
| 2009/0099756 | A1 * | 4/2009 | Demura ........................ 701/103 |
| 2009/0295375 | A1 | 12/2009 | Oohira |

FOREIGN PATENT DOCUMENTS

| JP | 61-147107 | 7/1986 |
| JP | 63-111408 | 5/1988 |
| JP | 10-170531 | 6/1998 |
| JP | 10-215504 | 8/1998 |
| JP | 2001-008307 | 1/2001 |
| JP | P2002-051585 A | 2/2002 |
| JP | P2004-129359 A | 4/2004 |
| JP | 2004-205345 | 7/2004 |
| JP | P2004-222448 A | 8/2004 |
| JP | P2004-242370 A | 8/2004 |
| JP | 2005-274193 | 10/2005 |

(Continued)

*Primary Examiner* — M. Thein
*Assistant Examiner* — Ariel Yu
(74) *Attorney, Agent, or Firm* — Nixon & Vanderhye, PC

(57) ABSTRACT

The traction motor control apparatus has a correction means for correcting an error included in a rotation detection signal outputted from a rotation angle sensor and outputting it as corrected rotation data for control of a motor. The correction means includes a rotation time predicting section configured to predict a predicted time necessary for the motor to rotate by a predetermined reference angle on the basis of a time having been elapsed for the motor to rotate by a predetermined angle, the time being calculated from the rotation detection signal outputted from the rotation angle sensor, a predicted rotation data generating section configured to generate a predicted rotation angle of the motor on the basis of the predicted time, and a corrected data updating section configured to update the corrected rotation data presently being outputted from the correction means in accordance with the predicted rotation angle.

13 Claims, 13 Drawing Sheets

FOREIGN PATENT DOCUMENTS

| | | |
|---|---|---|
| JP | 2006-029937 | 2/2006 |
| JP | 2006-064704 | 3/2006 |
| JP | 2006-262589 | 9/2006 |
| JP | 2007-033412 | 2/2007 |
| JP | 2007-078538 | 3/2007 |
| JP | 2007-187021 | 7/2007 |
| JP | 2007-248435 | 9/2007 |
| JP | 2008-185406 | 8/2008 |
| JP | 2008-271740 | 11/2008 |
| JP | 2009-145305 | 7/2009 |
| JP | 2010-019825 | 1/2010 |
| WO | WO2004/092683 | 10/2004 |

\* cited by examiner

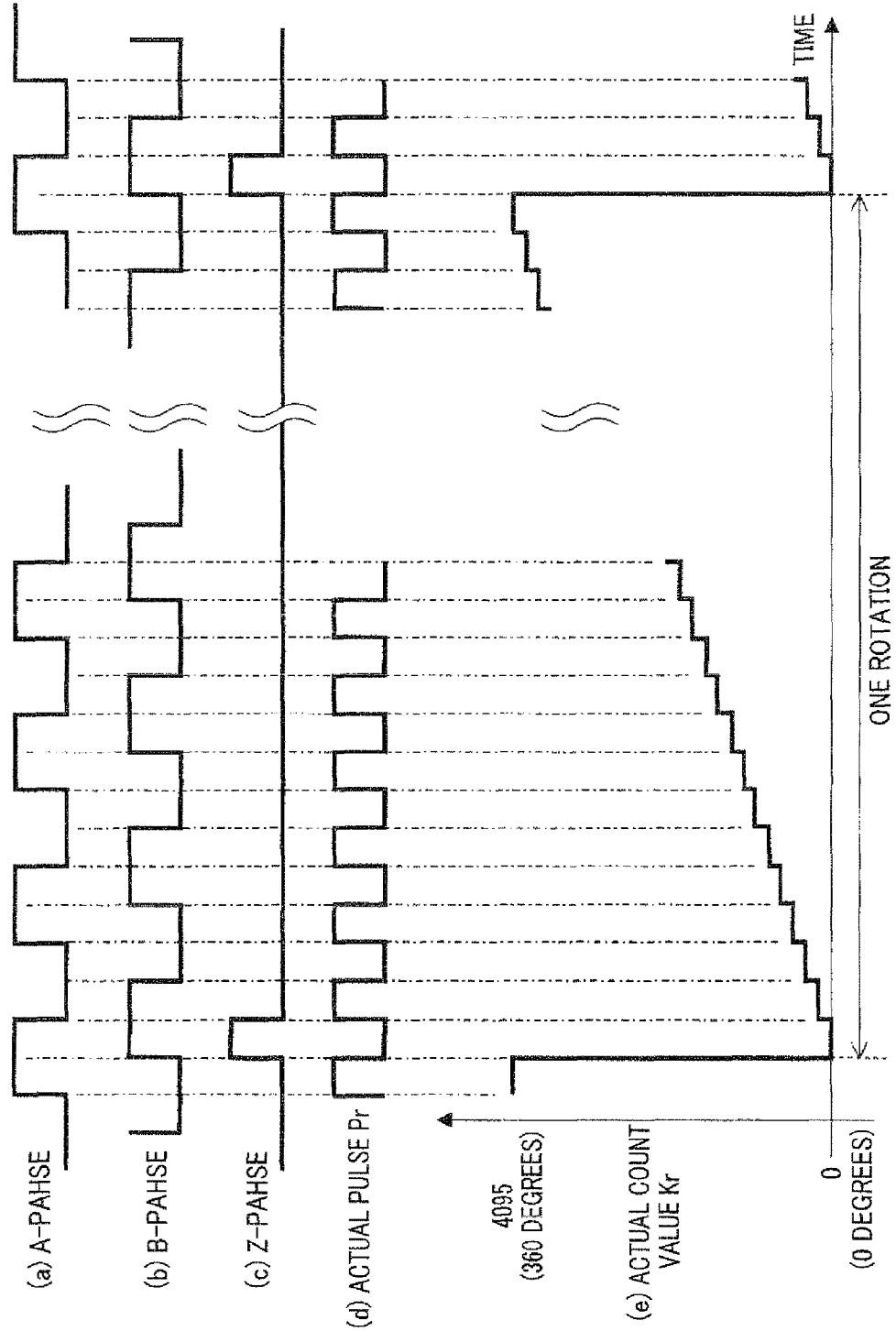

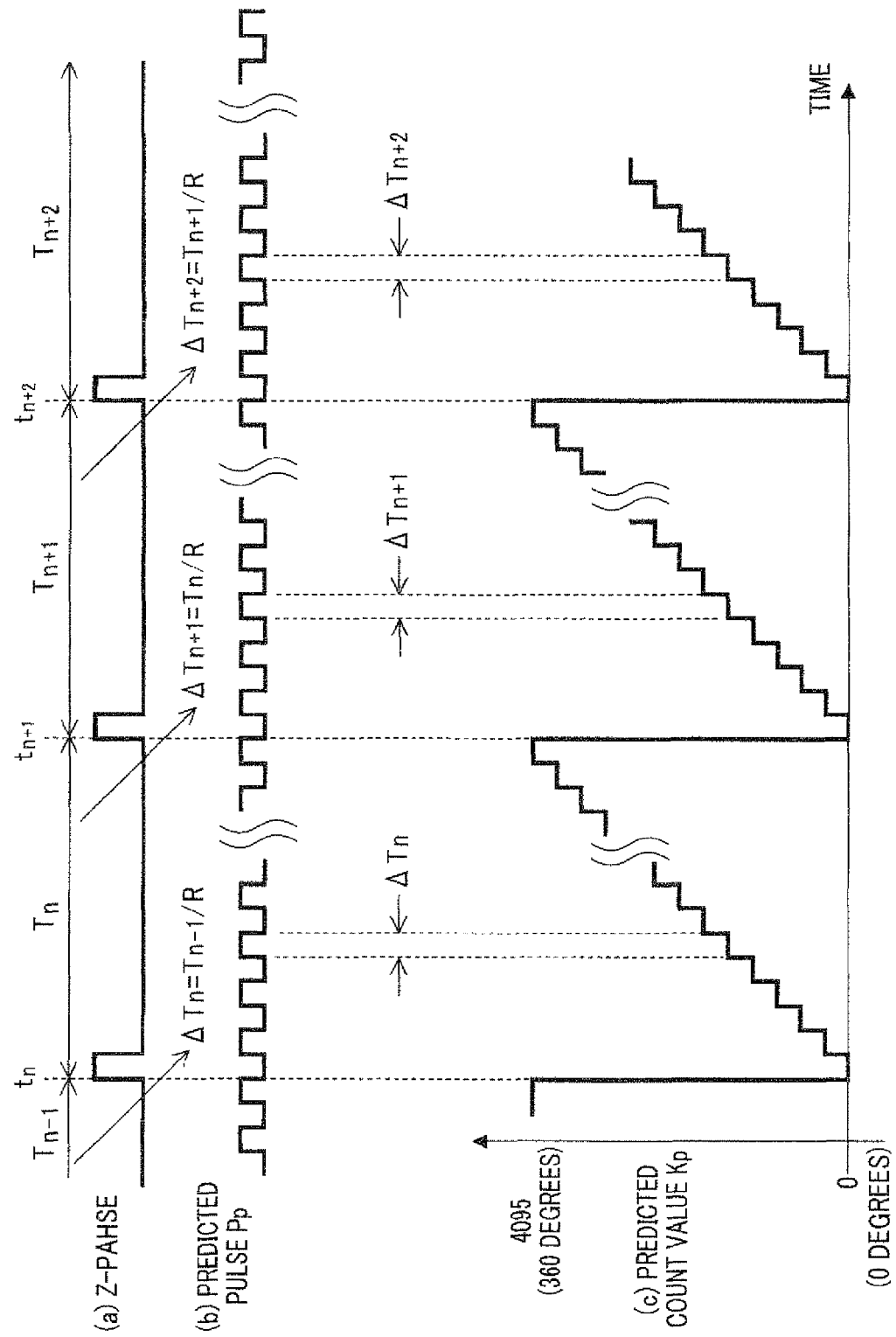

| 0 | 0 | 0 | 0 | 1 | 1 | 0 | 1 | 1 | 0 | 0 | 1 | 0 | 1 | 1 | 0 |

COUNT VALUE OF BASIC PULSE OF ONE CYCLE ($28250_{10}$)

⬇

(b)

DIVISION RESULT ⟷ (DECIMAL PART NEGLECTED)

| 0 | 0 | 0 | 0 | 1 | 1 | 0 | 1 | 1 | 0 | 0 | 1 | 0 | 1 | 1 | 0 |

SHIFT OPERATION RESULT

↓　　　　　　　↓
「6」　　　　(0.896973)

⬇

(c)

FIRST REGISTER | 1 | 1 | 1 | 0 | 0 | 1 | 0 | 1 | 1 | 0 | 1 | 0 | =3674 : TOTAL OUTPUT TIMES OF PREDICTED PULSE Pp7

SECOND REGISTER | 0 | 0 | 0 | 1 | 1 | 0 | 1 | 0 | 0 | 1 | 1 | 0 | = 422 : TOTAL OUTPUT TIMES OF PREDICTED TIMES Pp6

⬇

(d)

FIRST REGISTER | 1 | 1 | 1 | 0 | 0 | 1 | 0 | 1 | 1 | 0 | 1 | 0 |

SECOND REGISTER | 0 | 0 | 0 | 1 | 1 | 0 | 1 | 0 | 0 | 1 | 1 | 0 |

→ PREDICTED PULSE Pp7　57 TIMES
→ PREDICTED PULSE Pp6　66 TIMES

⬇

(e)

FIRST REGISTER | 1 | 1 | 1 | 0 | 0 | 1 | 0 | 1 | 1 | 0 | 1 | 0 |

SECOND REGISTER | 0 | 0 | 0 | 1 | 1 | 0 | 1 | 0 | 0 | 1 | 1 | 0 |

→ PREDICTED PULSE Pp7　114 TIMES
→ PREDICTED PULSE Pp6　13 TIMES

TRACTION MOTOR CONTROL APPARATUS FOR VEHICLE

This application claims priority to Japanese Patent Application No. 2009-179930 filed on Jul. 31, 2009, the entire contents of which are hereby incorporated by reference.

BACKGROUND OF THE INVENTION

1. Field of the Invention

The present invention relates to a control apparatus for a traction motor of a vehicle.

2. Description of Related Art

It is known that some of control apparatuses to control an electric motor used as a traction power source for an electric vehicle, a hybrid vehicle, or an electric train are configured to detect the rotation angle of the motor and control power supply to the motor in accordance with the detection result through a drive device such as an inverter. For example, refer to Japanese Patent Application Laid-Open No. 10-215504 (Patent document 1).

Patent document 1 describes a control apparatus which uses a resolver as a rotation angle sensor to detect the rotation angle of the motor. The resolver includes a rotor which rotates together with the output shaft of the motor and a stator, and is configured to output a rotation detection signal having a value varying depending on variation of the reluctance between the rotor and the stator thereof in accordance with the rotor position (accordingly, in accordance with the rotation angle of the motor). In the following description, to distinguish the stator and rotor of the resolver from those of the motor, the stator of the resolver is referred to as the resolver stator, and the rotor of the resolver is referred to as the resolver rotor.

When the resolver is of the two-phase type to output two rotation detection signals which are 90 degree apart from each other in electrical angle, it has a structure in which a primary coil is provided in one of the resolver rotor and the resolver stator, and a secondary coil is provided in the other. When the primary coil is applied with an excitation signal of a constant frequency, amplitude-modulated versions of the excitation signal are outputted from the secondary coil as the two rotation detection signals which are 90 degree apart from each other in electrical angle.

The rotation detection signals outputted from the resolver are analog signals. Accordingly, it is common to use an RDC (Resolver Digital Converter) in order to convert each of the rotation detection signals outputted from the resolver into digital angle data representing the rotation angle of the motor. The control apparatus controls power supply to the motor in accordance with the digital angle data received from the RDC.

For the RDC to output the digital angle data with high precision, it is ideal that the two rotation detection signals outputted from the resolver have the same amplitude, no offset, and a specific phase difference therebetween (90 degrees in the above example).

However, actually, the two rotation detection signals outputted from the resolver may have an amplitude difference therebetween, an offset, and a phase error due to manufacturing tolerance of the resolver, that is, the resolver-to-resolver variation in the shape, characteristics of the coils, the gap between the resolver rotor and the resolver stator etc.

When the rotation detection signal includes an error due to the manufacturing tolerance, also the angle data outputted from the RDC includes an error. In this case, the angle data outputted from the RDC become non-linear with respect to time although when the motor is rotating at a constant speed.

As a result, since the control apparatus controls power supply to the motor in accordance with the rotation angle of the motor erroneously determined by the angle data including an error received from the RDC, the motor cannot be controlled in an appropriate manner.

For example, when the vehicle runs at a constant speed and the vehicle driver presses the accelerator pedal at a constant force, if the motor is controlled in accordance with the angle data including the above error and accordingly not showing the correct rotation angle of the motor, the vehicle is applied with a longitudinal acceleration because of variation of torque of the motor caused by the above error although the vehicle driver does not change the pressing force to the accelerator pedal. This gives feeling of discomfort to the vehicle driver and passengers.

Other than the resolver as described above, there are other types of the rotation angle sensor for detecting the rotation angle of a motor, including an incremental encoder configured to output a pulse signal for each predetermined rotation angle range and output a pulse signal each time the motor rotates one turn, an absolute encoder configured to output angle data representing the present rotation angle for each predetermined rotation angle range, and a sensor constituted of a combination of a vertical hall element and a magneto-resistive element and configured to output a signal depending on the present rotation angle as disclosed in Japanese Patent Application Laid-Open No. 2008-185406 (Patent document 2). However, the output signal of each of the above encoders and the sensor may also include an error due to manufacturing tolerance as with the case of the above described resolver.

Incidentally, there is known a method for detecting the rotation angle of a motor, the method having a function of compensating for the error included in the rotation detection signal. For example, refer to Japanese Patent Application Laid-Open No. 10-170531 (Patent document 3). The rotation angle detecting method according to Patent document 3 is configured to measure the time necessary for the resolver rotor to rotate one turn when the motor is rotating at a constant speed, and calculate, on the basis of the measured time, m (m being a positive integer larger than 1 determined depending on the resolution of the resolver) angle data items as data reference θn (n being 1 to m). The angle data φn outputted from the resolver is compared with the angle data reference θn, and the difference therebetween is stored in a memory as a correction value for the angle data reference θn (n being 1 to m). To control the motor, each time the angle data φn is inputted, it is corrected by the correction value for the angle data φn stored in the memory.

According to the method described in Patent document 3, it is possible to compensate for the error included in the rotation detection signal due to manufacturing tolerance of the resolver, however, it involves a problem that the hardware scale of the control apparatus has to be increased.

That is, the method described in Patent document 3 needs to store the correction value for each predetermined angle range depending on the resolution of the resolver, a memory of a large capacity has to be provided.

In recent years, to control a traction motor with a high degree of accuracy, it is required to detect the rotation position of the motor at a resolution as high as possible. However, to address this requirement by the method described in Patent document 3, it is necessary to further increase the capacity of the memory to store the correction values.

SUMMARY OF THE INVENTION

The present invention provides a traction motor control apparatus for a vehicle having a traction motor as a traction power source thereof, a rotation angle output section configured to output first rotation data each time the motor rotates by a first reference angle and output second rotation data each time the motor rotates by a second reference angle of 360/n degrees (n being an integer larger than or equal to 1) larger than the first reference angle, and a motor control section to control power supply to the motor in accordance with the first and second rotation data, the traction motor control apparatus comprising, as correcting means for correcting the first rotation data and supplying the first rotation data having been corrected to the motor control section as corrected rotation data in place of the first rotation data, a rotation time predicting section configured to measure, each time an actual detected angle as an actual present rotation angle of the motor shown by the first and second rotation data changes by a predetermined predicting angle width, an elapsed time for the actual detected angle to change to a present value thereof from a value thereof earlier than the present value by the second reference angle, and predict, as predicted time, a time necessary for the motor to rotate by the first reference angle thereafter;

a predicted rotation data generating section configured to predict, each time the predicted time elapses from an output timing of the second rotation data as a prediction start timing, an angle by which the motor rotates with respect to the prediction start timing by assuming that the motor rotates by the first reference angle while the predicted time elapses, and generate the predicted rotation angle as predicted rotation data; and a corrected rotation data updating section configured to compare the predicted rotation angle shown by the predicted rotation data presently generated by the generating section with a corrected rotation angle shown by the corrected rotation data presently being outputted from the correcting means in order to update the corrected rotation such that the predicted rotation angle and the corrected rotation angle coincide with each other to output the updated rotation data at each output timing of the first rotation data, and to initialize the corrected rotation data at each output timing of the second rotation data such that the corrected rotation angle shown by the corrected rotation data, the predicted rotation angle shown by the predicted rotation data and the actual detected angle are set to the same value.

According to the present invention, there is provided a traction motor control apparatus for a vehicle, capable of properly correcting an error included in the output signal of a rotation angle sensor detecting the rotation angle of a traction motor, to thereby improve the control accuracy of the traction motor without increasing the hardware scale thereof.

Other advantages and features of the invention will become apparent from the following description including the drawings and claims.

BRIEF DESCRIPTION OF THE DRAWINGS

In the accompanying drawings:

FIG. 4 is an explanatory view explaining A-phase, B-phase and Z-phase signals outputted from an RD converting section included in the rotation angle detecting section, and an actual pulse Pr generated on the basis of these phase signals in the error correcting section and its count value (actual count value Kr);

FIG. 5 is an explanatory view explaining the Z-phase signal outputted from the RD converting section, and a predicted pulse Pp generated on the basis of the Z-phase signal in the error correcting section and its count value (predicted count value Kp);

FIG. 6 is an explanatory view explaining a division method performed by the traction motor control apparatus of this embodiment;

PREFERRED EMBODIMENTS OF THE INVENTION

Figure 1:
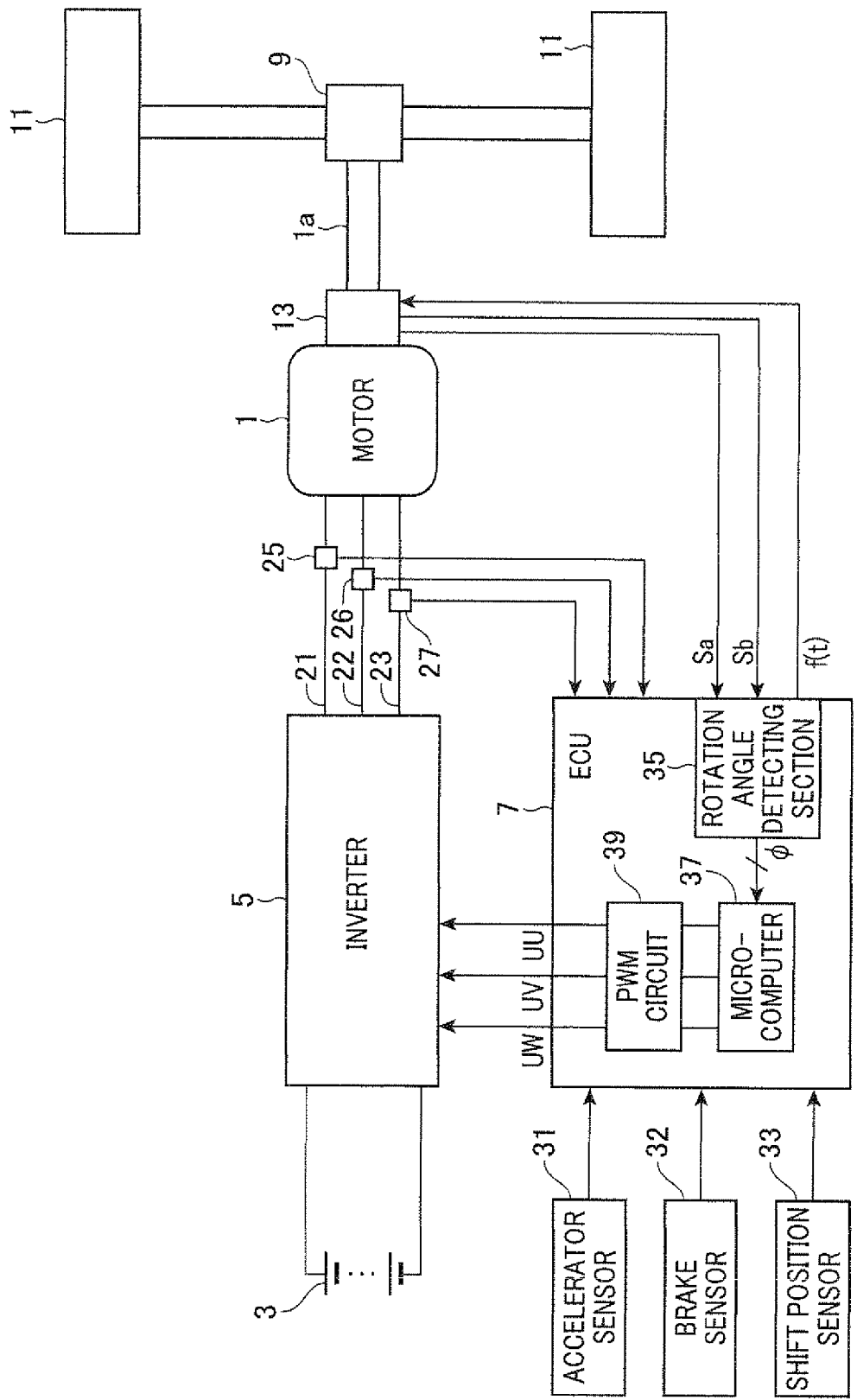
FIG. 1 is a block diagram showing the structure of a control system for an electric vehicle including a traction motor control apparatus according to an embodiment of the invention.

FIG. 1 is a block diagram showing the structure of a control system for an electric vehicle including a traction motor control apparatus according to an embodiment of the invention. As shown in FIG. 1, there are mounted on the vehicle a traction motor 1 which is an AC synchronous motor 1 (referred to simply as the motor 1 hereinafter), a battery 3 as a DC power source, an inverter 5 which converts the DC voltage of the battery 3 into a three-phase AC voltage (U-phase, V-phase and N-phase voltages) used to drive the motor 1, and a traction motor control apparatus 7 (referred to as an ECU 7 hereinafter) which controls the motor 1 through the inverter 5. The motor 1 includes an output shaft 1a coupled to each of left and right drive wheels 11 through a differential gear 9.

The inverter 5 includes six switching elements which may be IGBTs, and a driver circuit to drive the switching elements. The driver circuit turns on and off the switching elements in accordance with pulse width modulation signals UU, UV and UW received from the ECU 7 to convert the DC voltage of the battery 3 into the three-phase AC voltage.

A resolver 13 is mounted on the output shaft 1a of the motor 1 as a sensor to detect the rotation angle of the motor 1 (more precisely, the rotation angle of the rotor of the motor 1). The resolver 13 includes a resolver stator, and a resolver rotor rotatably disposed within the resolver stator and fixed to the output shaft 1a of the motor 1 to rotate together with the output shaft 1a.

The resolver 13 is configured such that the reluctance between the resolver rotor and the resolver stator varies depending on the rotational position of the resolver rotor (that is, depending on the rotational angle of the motor 1), so that two rotation detection signals Sa and Sb separated from each other by 90 degrees in electrical angle and each having an amplitude which varies sinusoidally in accordance with variation of the reluctance (that is, in accordance with the rotation angle of the motor 1) are outputted.

The structure of the resolver 13 is explained in the following in further detail. The resolver stator is provided with a primary coil and two secondary coils. When the primary coil is applied with an excitation signal f(t) of a constant frequency, a first rotation detection signal Sa (=f(t)·sin θ) having the waveform of the excitation signal f(t) amplitude-modulated by a signal sin θ is outputted from one of the two secondary coils, and a second rotation detection signal Sb (=f(t)·cos θ) having the waveform of the excitation signal f(t) amplitude-modulated by a signal cos θ is outputted from the other of the two secondary coils.

Here, θ is an angle of the rotational angle of the motor 1 multiplied by n (n being an integer larger than or equal to 1). Accordingly, θ represents an electrical rotational angle of the resolver 13 (electrical angle of the resolver 13). n represents a ratio of the electrical angle of the resolver 13 to the mechanical rotation angle of the motor 1. Generally, n is called the shaft multiple angle.

In the following explanation, unless otherwise noted, the term "rotation" used with respect to the resolver 13 means not the mechanical rotation but the electrical rotation of the resolver 13, and the term "cycle time" used with respect to the resolver 13 means one electrical rotation of the resolver 13. Accordingly, the rotation angle of the resolver 13 means the electrical rotational angle (electrical angle) of the resolver 13.

The resolver 13 is configured such that the period of variation of the reluctance between the resolver rotor and the resolver stator, that is the period of the rotation detection signals Sa and Sb (more precisely, the period of sin θ and cos θ as the fundamental component) is the same as the period of one rotation of the resolver rotor (that is, the one mechanical rotation of the motor 1). Accordingly, in this embodiment, the shaft multiple angle n is 1, and the electrical angle of the rotation detection signals Sa and Sb is equal to the mechanical angle of the resolver rotor.

It should be noted that the resolver 13 does not necessarily have the structure in which the shaft multiple angle n is 1, and it may have a structure in which N (N being an integer larger than or equal to 2) periods of the rotation detection signals Sa and Sb correspond to one rotation of the resolver rotor (that is the shaft multiple angle is N).

For example, in the case where the shaft multiple angle is 2, while the motor 1 rotates one turn, the rotational angle of the resolver 13 increases from 0 degrees to 720 degrees. In other words, while the motor 1 rotates a half turn, the resolver rotates one turn in this example.

Returning to FIG. 1, current sensor 25, 26 and 27 are provided respectively for current supply lines 21, 22 and 23 of the respective phases extending from the inverter 5 to the motor 1. The current sensor 25 detects a U-phase current level of the motor 1, and outputs a U-phase current signal indicative of the detected level. The current sensor 26 detects a V-phase current level of the motor 1, and outputs a V-phase current signal indicative of the detected level. The current sensor 27 detects a W-phase current level of the motor 1, and outputs a W-phase current signal indicative of the detected level. These current signals are inputted to the ECU 7.

The electric vehicle is provided with an accelerator sensor 31, a brake sensor 32 and a shift position sensor 33 as sensors to detect the running state of the electric vehicle.

The accelerator sensor 31 is mounted on an accelerator pedal (not shown) operated by the vehicle driver, and outputs an accelerator opening degree signal indicative of an amount of depression of the accelerator pedal. The brake sensor 32 is mounted on a brake pedal (not shown) operated by the vehicle driver, and outputs a brake hydraulic pressure signal indicative of an amount of depression of the break pedal. The shift position sensor 33 is mounted on a shift lever (not shown) operated by the vehicle driver to detect to which of the driving position, neutral position, reverse position and parking position the shift lever is set, and outputs a shift position signal indicative of the detected position of the shift lever.

These signals outputted from the sensors 31 to 33 are also inputted to the ECU 7. The ECU 7 includes a rotation angle detecting section 35 and a PWM (Pulse Width Modulation) circuit 39. The rotation angle detecting section 35 supplies the excitation signal f(t) to the resolver 13, and outputs digital angle data φ representing the rotational angle of the motor 1 in accordance with the rotation detection signal Sa and Sb received from the resolver 13. The PWM circuit 39 is constituted of a microcomputer 39 including a CPU, a ROM, a RAM and an I/O circuit. The angle data φ outputted from the rotation angle detecting section 35 is data representing the rotation angle of the resolver 13 and not directly representing the rotation angle of the motor 1. However, since the shaft multiple angle is 1 in this embodiment, the angle data φ outputted from the rotation angle detecting section 35 represents the rotational angle of the motor 1 accordingly.

The PWM circuit 39 generates the pulse width modulation signals UU, UV and UW corresponding to the respective phases of the motor 1 in accordance with a control signal received from the microcomputer 37, and supplies them to the inverter 5. As a result, the three-phase AC current including the U-phase, V-phase and W-phase currents is supplied from the inverter 5 to the motor 1.

The microcomputer 37 receives the angle data φ from the rotation angle detecting section 35, and calculates the rotation speed of the motor 1 based on the variation per unit time of the angle data φ.

Also, the microcomputer 37 drives the inverter 5 in accordance with the rotational angle and rotation speed of the motor 1, and the output signals of the current sensors 25 to 27 and the output signals of the sensors 31 to 33 in order to cause the motor 1 to generate desired torque depending on the running state of the vehicle. It is briefly explained how the motor 1 is controlled in the following.

The microcomputer 37 calculates a demand amount of torque which the motor 1 should generate in accordance with the rotation angle and rotation speed of the motor 1, vehicle running state data including the accelerator opening degree signal, brake hydraulic pressure signal and shift position signal inputted thereto, and calculates, on the basis of the calculated demand amount of torque, a current command vector in accordance with which the motor 1 is supplied with power through vector operation. Further, the microcomputer 37 outputs the control signal to the PWM circuit 39 to cause the motor 1 to generate the demand amount of torque. Also at this time, the microcomputer 37 feedback-controls, in accordance with the output signals from at least two of the current sensors 25 to 27 (for example, the U-phase and W-phase current signals), the control signal supplied to the PWM circuit 39 (and accordingly, the pulse-width signals UU, UV and UW outputted from the PWM circuit 39 to the inverter 5) so that each of the respective phase currents flowing through the motor 1 is kept at a target value.

Figure 2:
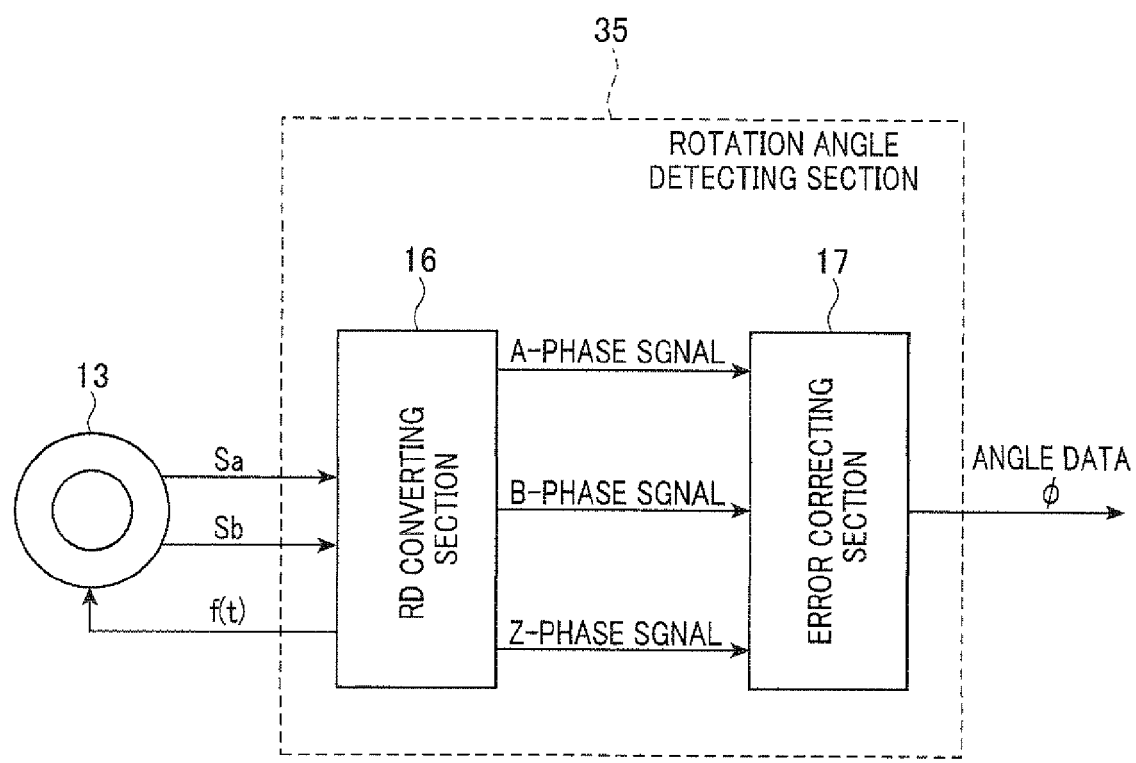
FIG. 2 is a block diagram showing the structures of a resolver and a rotation angle detecting section included in the control system shown in FIG. 1.
Figure 3:
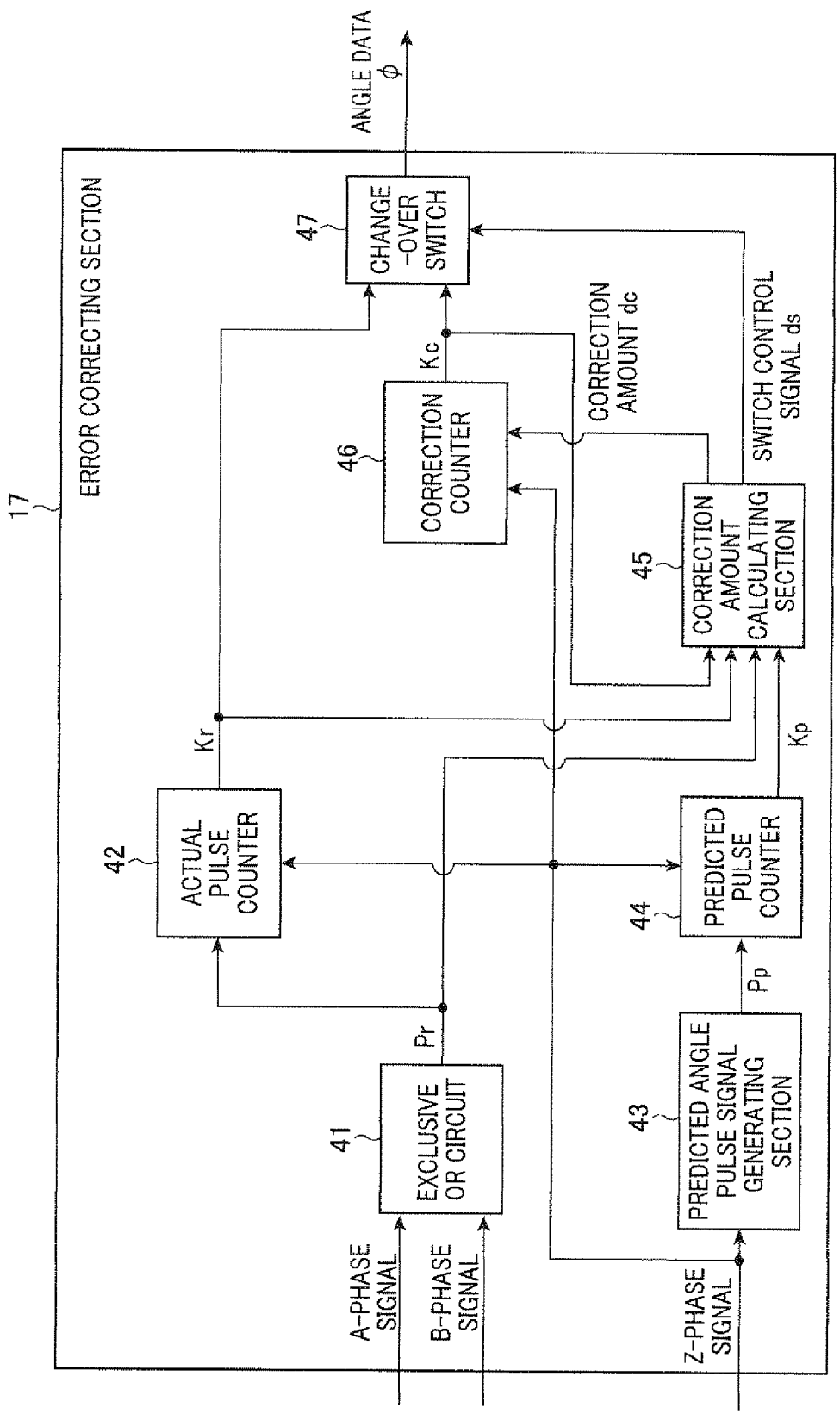
FIG. 3 is a block diagram showing the structure of an error correcting section included in the rotation angle detecting section.

Next, the structure of the rotation angle detecting section 35 is explained with reference to FIG. 2 and FIG. 3. FIG. 2 shows the schematic structures of the resolver 13 and the rotation angle detecting section 35. FIG. 3 shows the structure of the error correcting section 17 included in the rotational angle detecting section 35.

As shown in FIG. 2, the rotational angle detecting section 35 includes the RD converting section 16 and the rotational angle detecting section 35. The RD converting section 16 supplies the excitation signal f(t) to the resolver 13, and generates A-phase, B-phase and Z-phase signals as rotation data representing the rotation angle of the motor 1 (more precisely, the rotation angle of the resolver 13) from the rotation detection signals Sa and Sb received from the resolver 13.

The RD converting section 16, which is an RDC (Resolver Digital Converter) of the digital tracking type, converts the rotation detecting signals Sa and Sb received from the resolver 13 into digital data representing the rotational angle of the resolver 13 (referred to as "actual detection data" hereinafter). Since it is well known how the conversion is performed, explanation of the method of the conversion is omitted here.

The RD converting section 16 includes an encoder/emulator in order to change the actual detection data into pulse signals (A-phase signal, B-phase signal and Z-phase signal) equivalent to signals outputted from the so-called incremental encoder. Examples of these signals are shown in sections (a) to (c) of FIG. 4.

As shown in sections (a) to (c) of FIG. 4, each of the A-phase signal and B-phase signal is a pulse train in which a pulse is generated each time the resolver 13 rotates by a predetermined angle. The A-phase signal and the B-phase signal are separated in phase from each other by 90 degrees. The Z-phase signal is a pulse signal in which a pulse is generated each time the resolver 13 rotates one turn to identify the home position (0-degree position) of the resolver 13.

The error correcting section 17 calculates an exclusive OR of the A-phase signal and the B-phase, and generates an actual pulse Pr as the calculation result (see section (d) of FIG. 4). The total number of the rising and falling edges of the actual pulses Pr generated during one rotation of the resolver 13 represent the resolution of the RD converting section 16.

In this embodiment, the resolution of the RD converting section 16 is 12 bits (0-4095). Accordingly, while the resolver 13 rotates one turn (from 0 to 360 degrees), the actual pulse Pr is generated 2048 times, and accordingly the pulse edge occurs 4096 times during this period.

The angle of rotation of the resolver 13 during a period between two consecutive timings of occurrence of the pulse edge is the minimum detectable angle range of the resolver 13. In this embodiment, the angle of rotation of the resolver per the pulse width of the actual pulse Pr is 360/4096 degrees, which may be referred to as "resolution angle" hereinafter.

It is ideal that the two rotation detection signals Sa and Sb outputted from the resolver 13 have the same amplitude, no offset, and a phase difference of 90 degrees therebetween. However, actually, the rotation detection signals Sa and Sb outputted from the resolver 13 include an error due to manufacturing tolerance. Therefore, the actual detection data generated in the RD converting section 16 also includes an error, as a result of which the A-phase and B-phase signal include an error.

Accordingly, this embodiment is provided with the error correcting section 17 disposed in the rotation angle detecting section 35 to correct the detection result by the RD converting section 16. The error correcting section 17 generates the angle data φ including no or less error due to manufacturing tolerance on the basis of the A-phase, B-phase and Z-phase signals received from the RD converting section 16. The angle data φ generated by the error correcting section 17 is inputted to the microcomputer 37.

As shown in FIG. 3, the error correcting section 17 includes an exclusive OR operating section 41, an actual pulse counter 42, a predicted angle pulse signal generating section 43, a predicted pulse counter 44, a correction amount calculating section 45, a correction counter 46 and a output change-over switch 47.

The exclusive OR operating section 41 calculates an exclusive OR of the A-phase signal and the B-phase signal, and generates the actual pulse Pr in accordance with the calculation result (see section (d) of FIG. 4). The actual pulse counter 42 counts the actual pulse Pr received from the exclusive OR operating section 41. In more detail, the actual pulse counter 42 increments its count value each time it detects the rising or falling edge of the actual pulse Pr to counts the rising and falling edges of the actual pulse Pr, and outputs the count value thereof as the actual count value Kr.

The actual pulse counter 42 receives also the Z-phase signal, so that the actual count value Kr is reset to 0 each time the pulse of the Z-phase signal rises. That is, the actual pulse counter 42 starts to count the actual pulse Pr each time the pulse edge of the Z-phase signal rises from the initial value of 0 of the actual count value Kr.

An example of output of the actual count value Kr with respect to the actual pulse Pr is shown in section (e) of FIG. 4. As shown in section (e) of FIG. 4, the actual count value Kr is reset to 0 at each timing of rise of the pulse edge of the Z-phase signal, and thereafter incremented at each timing of occurrence of the pulse edge of the actual pulse Pr. In this embodiment, since the resolution of the RD converting section 16 is 12 bits as explained above, the actual count value Kr takes the value from 0 to 4095 while the resolver 13 rotates one turn from 0 to 360 degrees.

The predicted angle pulse signal generating section 43 predicts (estimates) the time needed for the resolver 13 to further rotate by the resolution angle at each timing of rise of the pulse edge of the Z-phase signal on the basis of the pulse interval T of the Z-phase signal and the resolution of the RD converting section 16, and generates a predicted pulse Pp having a pulse width of the predicted time.

In more detail, the predicted angle pulse signal generating section 43 measures, at each timing of rise of the pulse edge of the Z-phase signal, the pulse interval of the immediate previous Z-phase signal (the time interval between the previous timing of rise of the pulse edge and the present timing of rise of the pulse edge). This measured interval is the time actually elapsed for the resolver 13 to rotate one turn (which may be referred to as "cycle time" of the resolver 13). The cycle time of the resolver 13 is divided by the resolution of the resolver 13 (4096 in this embodiment) to calculate the resolution time of the resolver 13. The pulse width of the predicted pulse Pp is equal to the calculated resolution time.

The operation of the predicted angle pulse signal generating section 43 is explained in detail with reference to FIG. 5. FIG. 5 shows the Z-phase signal in section (a), and shows the predicted pulse Pp in section (b). When the pulse of the Z-phase signal is inputted at time $t_n$, for example, the elapsed time $T_{n-1}$ of the immediately previous cycle time of the resolver 13 is measured, and the measured elapsed time $T_{n-1}$ is divided by the resolution R to obtain the predicted pulse width $\Delta T_n$. Accordingly, the predicted pulse Pp is generated such that the pulse edge occurs at each elapse of the predicted pulse width $\Delta T_n$ after the time tn until time $t_{n+1}$ at which the next pulse of the Z-phase signal is inputted.

Thereafter, when the pulse of the Z-phase signal is inputted again at time $t_{n+1}$, the elapsed time $T_n$ of the immediately previous cycle time of the resolver 13 is measured, and the measured elapsed time $T_n$ is divided by the resolution R to obtain the predicted pulse width $\Delta T_{n+1}$. Accordingly, the predicted pulse Pp having the predicted pulse width $\Delta T_{n+1}$ is successively generated after the time $t_{n+1}$ until time $t_{n+2}$ at which the next pulse of the Z-phase signal is inputted. When time $t_{n+2}$ has come, the operation same as above is performed.

Here, the division to calculate the predicted pulse width $\Delta T$ may be performed by the well-known shift operation. In more detail, to measure the elapsed time T (the pulse interval of the Z-phase signal) of the immediately previous cycle time of the resolver 13, a count value CTr corresponding to the elapsed time T is obtained by use of a counter whose count value is incremented at a predetermined period. By right-shifting the count value Ctr by the number of bits corresponding to the resolution R (12 bits in this embodiment), the predicted pulse width $\Delta T$ can be obtained.

However, the division performed by such a simple shift operation is not so accurate, and accordingly, the calculated predicted pulse width $\Delta T$ may not be sufficiently precise depending on conditions. In view of the above, in this embodiment, the contents of the bits which have been ignored due to right-shift operation are taken into account to obtain the predicted pulse width $\Delta T$ which is sufficiently precise. A method therefor is explained in detail with reference to FIG. 6.

To obtain the predicted pulse width $\Delta T$, it is necessary to measure the elapsed time T of one cycle time of the resolver 13. In this embodiment, the measurement is performed by counting a basic pulse having a frequency of 40 MHz (period of 25 nsec.) by use of a counter. An example of the measurement obtained as 15-digit count value is shown in section (a) of FIG. 6. This count value is 28250 in decimal. That is, this measurement means that the basic pulse has been counted 28250 times during one rotation of the resolver 13.

The predicted pulse width $\Delta T$ is calculated on the basis of this count value. That is, in view of the resolution of the RD converting section 16 (12 bits: 0-4095), the count value of 28250 is divided by 4096. In more detail, as shown in section (a) of FIG. 6B, 12-bit right shift operation is performed. As a result, the value of 6 is obtained as a division result. It means that the predicted pulse width $\Delta T$ is equivalent to six consecutive occurrences of the basic pulse.

However, the division result of 6 by the shift operation is not a correct value. Because, the division result of 6 is a value in which the part after the decimal point is ignored by the right shift operation. In fact, the value of 28250/4096 is 6.896973 . . . , which is closer to 7 rather than 6.

Accordingly, if the predicted pulse Pp is outputted as having the predicted pulse width equivalent to six consecutive occurrences of the basic pulse, the ignored part after the decimal point (0.896973 . . . ) continues to be accumulated as an error. As a result, although the counted number of the predicted pulses Pp (the predicted count value Kp) reaches 4095, it is regarded that the resolver 13 has not yet made one rotation.

Accordingly, in this embodiment, the part after the decimal point is sufficiently taken into account to generate the predicted pulse Pp which is sufficiently precise. As explained above, since the correct result of the division is not 6 but 6.896973 . . . , the predicted pulse width $\Delta T$ should be determined to be the period of 6.896973 . . . pieces of the basic pulse, if possible. However, it is practically impossible to output the predicted pulse Pp each time 6.896973 . . . pieces of the basic pulse are outputted.

Accordingly, in this embodiment, a predicted pulse Pp6 whose predicted pulse width $\Delta T$ is equivalent to the period of six pieces of the basic pulse and a predicted pulse Pp7 whose predicted pulse width $\Delta T$ is equivalent to the period of seven pieces of the basic pulse are outputted alternately. In more detail, by outputting the predicted pulse Pp7 more frequently than the predicted pulse Pp6, the same result of outputting the predicted pulse Pp having the predicted pulse width $\Delta T$ equivalent to the period of 6.896973 . . . pieces of the basic pulse is obtained.

To actualize this, the number of the predicted pulse Pp7 and the number of the predicted pulse Pp6 to be outputted during one rotation of the resolver 13 are calculated in advance. Since the total number of the predicted pulse Pp to be outputted during one rotation of the resolver 13 is 4096, the sum of the numbers of the predicted pulse Pp7 and the predicted pulse Pp6 has to be 4096. Accordingly, as shown in section (c) of FIG. 6, the numerical value represented by 12 bits after the decimal point of the division result (3674 in the case of FIG. 6) is set in a first register as the number of output times of the predicted pulse Pp7. Further, the numerical value represented by the 12 bits which are respectively inverted, and added by 1 (4096−3674=422 in the case of FIG. 6) is set in a second register as the number of output times of the predicted pulse Pp6.

It is possible to output the predicted pulse Pp 4096 times in the end by outputting the predicted pulse Pp7 3674 times successively, and then successively outputting the predicted pulse Pp6 422 times. However, in this case, since the error continues to increase while the predicted pulse Pp7 is outputted, and the error continues to decrease while the predicted pulse Pp6 is outputted, the error becomes too large transiently.

Accordingly, it is necessary to output the predicted pulses Pp7 and Pp6 at well balanced timings in order to prevent the error from becoming too large during the one cycle time. For example, this is possible by repeating, during one cycle time, a sequence in which the predicted pulse Pp7 is successively outputted J times and then the predicted pulse Pp6 is successively outputted K times as explained below.

First, a base pulse output ratio representing the number of output times of the predicted pulse Pp7 per one output time of the predicted pulse Pp6 is determined. In more detail, as shown in section (c) of FIG. 6, the base pulse output ratio is determined on the basis of the number of the bits located from the MSB position to the bit position at which the value of 1 first appears. In the case of section (c) of FIG. 6, the value of 1 first appears at the fourth bit position from the MSB position of the second register. Accordingly, the base pulse output ratio is determined on the basis of the numerical value represented by the upper four bits in each of the first and second registers. In this case, the base pulse output ratio is determined such that the number of output times of the predicted pulse Pp7 is 14, and that of the pulse Pp6 is 1.

The predicted pulses Pp7 and Pp6 are outputted in accordance with the determined base pulse output ratio. That is, in this case, the sequence of successively outputting the predicted pulse Pp7 14 times, followed by outputting the predicted pulse Pp6 once is repeated.

However, the base pulse output ratio (14:1) is a value of four-bit precision, it may be too coarse in some cases. If the pulse output ratio is determined at 6-bit resolution to improve its resolution, it shows the ratio of 57:6 as shown in section (d) of FIG. 6. If the pulse output ratio is determined at 7-bit resolution to further improve its resolution, it shows the ratio of 114:13 as shown (e) of FIG. 6.

If the predicted pulses Pp7 and Pp6 are outputted in accordance with the base pulse output ratio (14:1), when the predicted pulse Pp7 has been outputted 57 times, the predicted pulse Pp6 has been outputted only 4 times. Accordingly, in this case, there occurs error with respect to the case in which the predicted pulses Pp7 and Pp6 are outputted in accordance with the pulse output ratio determined at 6-bit resolution (section (d) of FIG. 6).

If the predicted pulses Pp7 and Pp6 continue to be outputted in accordance with the base pulse output ratio (14:1), when the predicted pulse Pp7 has been outputted 112 times, the predicted pulse Pp6 has been outputted only 7 times. Accordingly, in this case, there occurs large error with respect to the case in which the predicted pulses Pp7 and Pp6 are outputted in accordance with the pulse output ratio determined at 7-bit resolution (FIG. 6E).

Accordingly, it is preferable that when the predicted pulses Pp7 and Pp6 have been outputted at the base pulse output ratio (14:1) for a some period, they are outputted in different pulse output ratio depending on the difference in the number of output times between the case of outputting them at the base pulse output ratio (14:1) and the case of outputting them at the pulse output ratio of desired higher resolution.

For example, in a case where when the predicted pulse Pp7 have been outputted 57 times, the predicted pulse Pp6 have been outputted only 4 times, the output of the predicted pulse Pp7 is stopped, and the predicted pulse Pp6 is successively outputted until the number of its output times reaches 6 in accordance with the pulse output ratio of 6-bit resolution. When the condition where the number of output times of the predicted pulse Pp7 is 57 and that of the predicted pulse Pp6 is 6 in accordance with the pulse output ratio of 6-bit resolution is reached, they are outputted in accordance with the base pulse output ratio (14:1) again.

Next, comparison with the pulse output ratio (114:13) of 7-bit resolution is made. To this end, the predicted pulses Pp7 and Pp6 continue to be outputted in accordance with the base pulse output ratio (14:1) until the number of output times of the predicted pulse Pp7 reaches 114 or the number of output times of the predicted pulse Pp6 reaches 13.

Here, it is assumed that the number of output times of the predicted pulse Pp7 reaches 114 before the number of output times of the predicted pulse Pp6 reaches 13. When the number of output times of the predicted pulse Pp7 has reached 114, the number of output times of the predicted pulse Pp6 is 9 which is not consistent with the pulse output ratio of 7-bit resolution. Accordingly, the output of the predicted pulse Pp7 is stopped, and the predicted pulse Pp6 is successively outputted until the number of output times reaches 13. When the condition where the number of output times of the predicted pulse Pp7 is 57 and that of the predicted pulse Pp6 is 13 in accordance with the pulse output ratio of 7-bit resolution is reached, they are outputted in accordance with the base pulse output ratio (14:1) again.

The resolution of the pulse output ratio depends on the cases. It may be ended up with the 7-bit resolution, or may be further increased. Returning to FIG. 3, the predicted pulse counter 44 counts the predicted pulse Pp generated by the predicted angle pulse signal generating section 43. In more detail, the predicted pulse counter 44 increments its count value each time it detects the rising or falling edges of the predicted pulse Pp, and outputs the count value as the predicted count value Kp.

The predicted pulse counter 44 receives also the Z-phase signal, so that the predicted count value Kp is reset to 0 each time the pulse of the Z-phase signal rises. That is, the predicted pulse counter 44 starts to count the predicted pulse Pp from the initial value of 0 of the predicted count value Kp at each timing when the pulse edge of the Z-phase signal rises.

An example of output of the predicted count value Kp with respect to the actual pulse Pp is shown in section (c) of FIG. 5. The predicted count value Kp is reset to 0 at each timing of rise of the pulse edge of the Z-phase signal, and thereafter incremented at each timing of occurrence of the pulse edge of the predicted pulse Pp. In this embodiment, since the resolution of the RD converting section 16 is 12 bits as explained above, the predicted count value Kp takes the value from 0 to 4095 while the resolver 13 rotates one turn from 0 to 360 degrees.

The actual count value Kr is a value showing a result of an actual detection generated on the basis of the respective phase signals outputted from the resolver 13, while, the predicted count value Kp is a value generated on the basis of the prediction that the rotation angle of the resolver 13 will increase by the resolution angle for each lapse of the predicted pulse width $\Delta T$. Although the predicted count value Kp is a value on the basis of the prediction, it is a reliable value because it reflects the immediately previous rotating state of the resolver 13.

The correction counter 46 generates a corrected count value Kc incremented in accordance with an increment command received from the correction amount calculating section 45. In more detail, the correction counter 46 receives the Z-phase signal, and also a correction amount dc at each edge change timing of the actual pulse Pr outputted from the correction amount calculating section 45.

The correction counter 46 starts to increment (update) the count value thereof from the initial value of 0 of the corrected count value Kc at each pulse edge rising timing of the Z-phase signal in accordance the increment command (correction amount dc) outputted from the correction amount calculating section 45.

The output change-over switch 47 receives the actual count value Kr outputted from the actual pulse counter 42, the corrected count value Kc outputted from the correction counter 46 and a switch control signal ds outputted from the correction amount calculating section 45, and outputs one of the actual count value Kr and the corrected count value Kc, which is designated by the switch control signal ds, as the angle data $\phi$.

The switch control signal ds, which is a digital signal having a value of 0 or 1. When the switch control signal ds takes the value of 1, the corrected count value Kc is outputted as the angle data $\phi$, and when the switch control signal ds takes the value of 0, the actual count value Kr is outputted as the angle data $\phi$.

The correction amount calculating section 45 is triggered by each pulse edge occurrence timing of the actual pulse PR (each incremental timing of the actual count value Kr) to perform generation and output of the correction amount dc, and setting of the switch control signal ds. Next, specific processes performed by the correction amount calculating section 45 is explained with reference to FIGS. 7 to 10.

Figure 7:
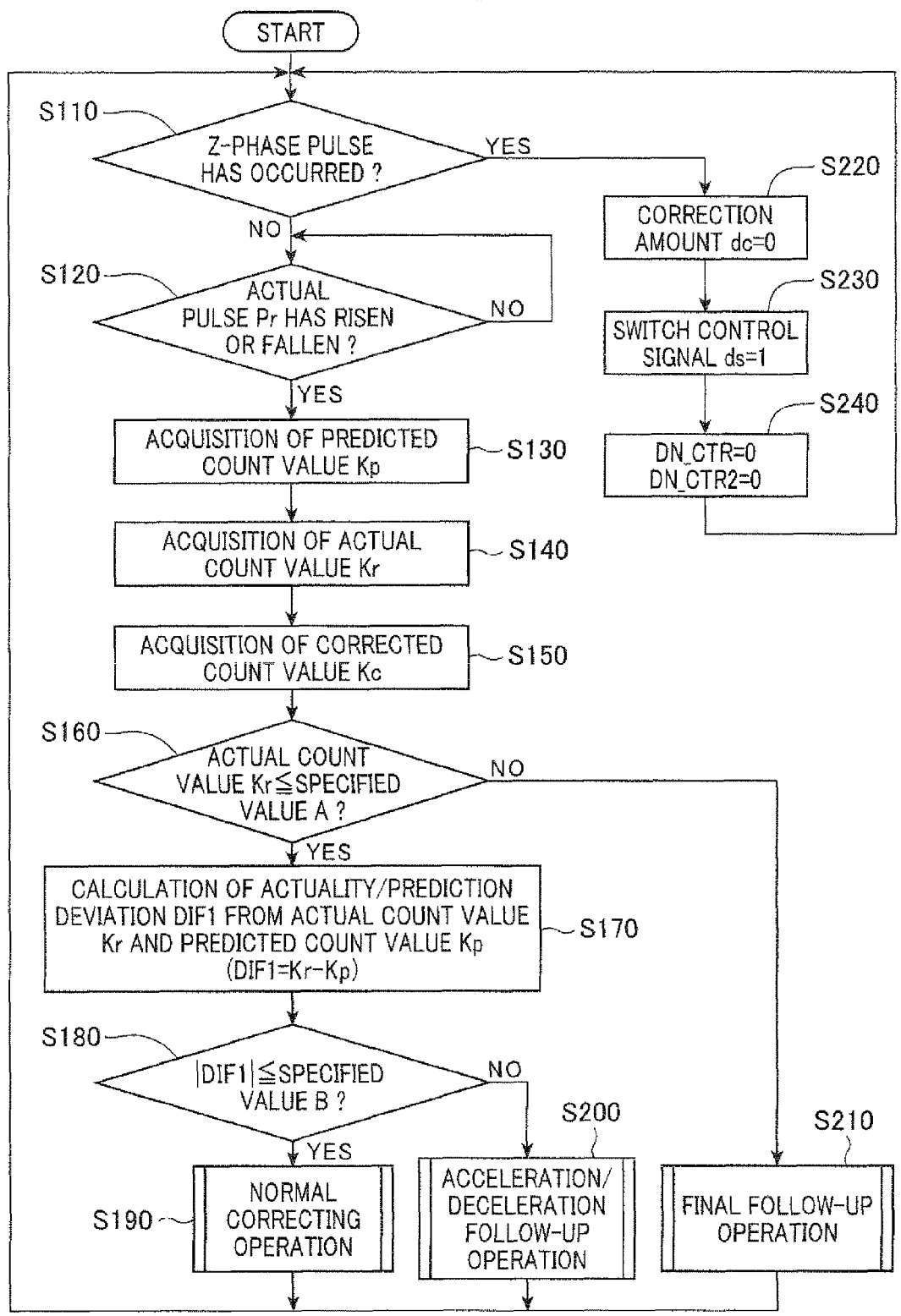
FIG. 7 is a flowchart showing the correction amount calculating process performed by the correction amount calculating section included in the error correcting section.

FIG. 7 is a flowchart showing a correction amount calculating process performed by the correction amount calculating section 45. The correction amount calculating section 45 starts operation when the error correcting section 17 is supplied with power from a control power source (not shown) provided in the ECU 7. Although not limited, it is preferable that the correction amount calculating process is performed within a period shorter than the predicted pulse width ΔT at an expected maximum speed of the motor 1.

This process begins by determining whether or not the pulse (the rising edge) of the Z-phase signal has occurred at step S110. If the determination result at step S110 is affirmative, the process proceeds to step S220 to set the correction amount dc to 0, and then proceeds to step 230 to set the switch control signal ds to 1 so that the corrected count value Kc is outputted as the angle data φ. Thereafter, the process proceeds to step S240 to set both a first variable DN_CTR and a second variable DN_CTR2 to 0. Steps S220 to S240 are provided to perform a series of initializing operations each time the pulse of the Z-phase signal occurs.

The determination at step S110 may be made by checking whether the actual count value Kr received from the actual pulse counter 42 has been reset to 0, or checking whether the predicted count value Kp received from the predicted pulse counter 44 has been reset to 0, for example. Alternatively, the determination may be made by taking in the Z-phase signal directly.

On the other had, if the determination result at step S110 is negative, the process proceeds to step S120 to wait until the rising or falling edge of the actual pulse Pr occurs. If the rising or falling edge of the actual pulse Pr is detected to have occurred at step S120, the process proceeds to step S130.

At step S130, the predicted count value Kp outputted from the predicted pulse counter 44 is acquired. Subsequently, the actual count value Kr outputted from the actual pulse counter 42 is acquired at step S140. Next, at step 150, the corrected count value Kc outputted from the correction counter 46 is acquired. The count values Kp, Kr and Kc acquired respectively are used in step S160 and the following steps.

At step S160, it is determined whether or not the actual count value Kr is smaller than or equal to a specified value A representing a boundary angle. Step S160 is provided to check whether the resolver 13 has entered a predetermined final rotation range (a boundary angle range situated somewhere between 0 to 360 degrees designate by the specified value A) of the resolver 13. If the determination result at step S160 is affirmative, the process proceeds to step S170 assuming that the resolver 13 has not yet entered the predetermined final rotation area, while if the determination result at step S160 is negative, the process proceeds to step S210 to perform a final follow-up operation assuming that the resolver 13 has entered the predetermined final rotation area.

At step S170, the actual count value Kr is subtracted by the predicted count value Kp, and the subtraction result is made an actuality/prediction deviation DIF1. At subsequent step S180, it is determined whether or not the absolute value of the actuality/prediction deviation DIF1 is smaller than or equal to a specified value B.

The specified value B is an index to determine whether the motor 1 (or the resolver 13) is in the constant-speed rotating state, or in the accelerating/decelerating state.

If the resolver 13 is the ideal one with no manufacturing tolerance applied, the actual count value Kr and the predicted count value Kp coincide with each other when the resolver 13 is rotating at a constant speed. However, actually, the actual count value Kr and the predicted count value Kp may not coincide with each other even when the resolver 13 is rotating at a constant speed because of manufacturing tolerance of the resolver 13, the conversion accuracy of the RD converting section 16, etc.

Accordingly, it is preferable that the specified value B is set larger than an expected value of the deviation between these count values when the resolver 13 is rotating at a constant speed, so that the motor 1 is not erroneously detected to be accelerating or decelerating although when it is rotating at a constant speed.

If the determination result at step 180 is affirmative, the process proceeds to step S190 to perform a normal correcting operation assuming that the motor 1 is in the constant-speed rotating state. On the other hand, if the determination result at step 180 is negative, the process proceeds to step S200 to perform an acceleration/deceleration follow-up operation assuming that the motor 1 is in the accelerating/decelerating state.

Figure 9:
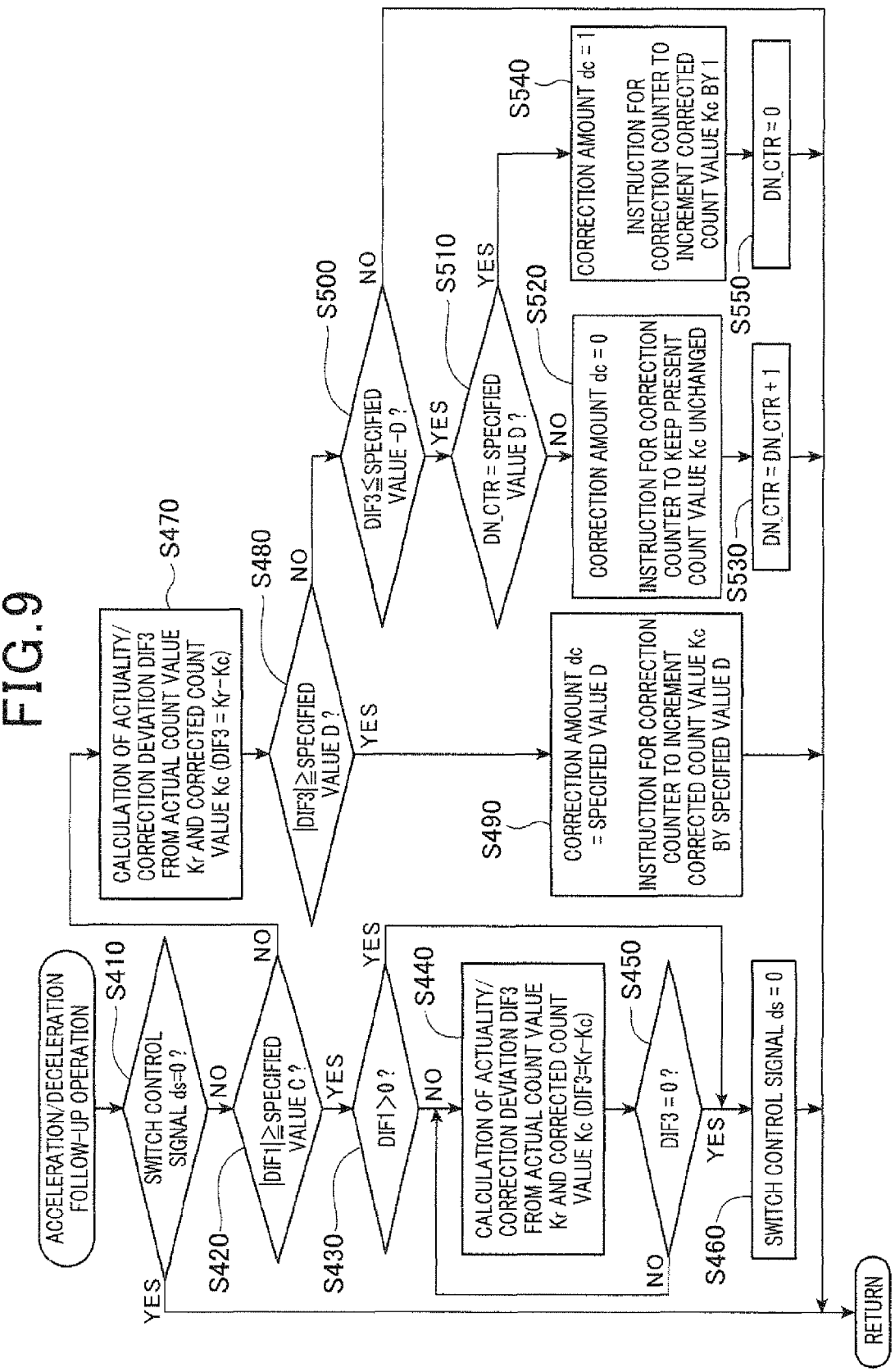
FIG. 9 is a flowchart showing an acceleration/deceleration follow-up operation performed at step S200 of the correction amount calculating process.
Figure 10:
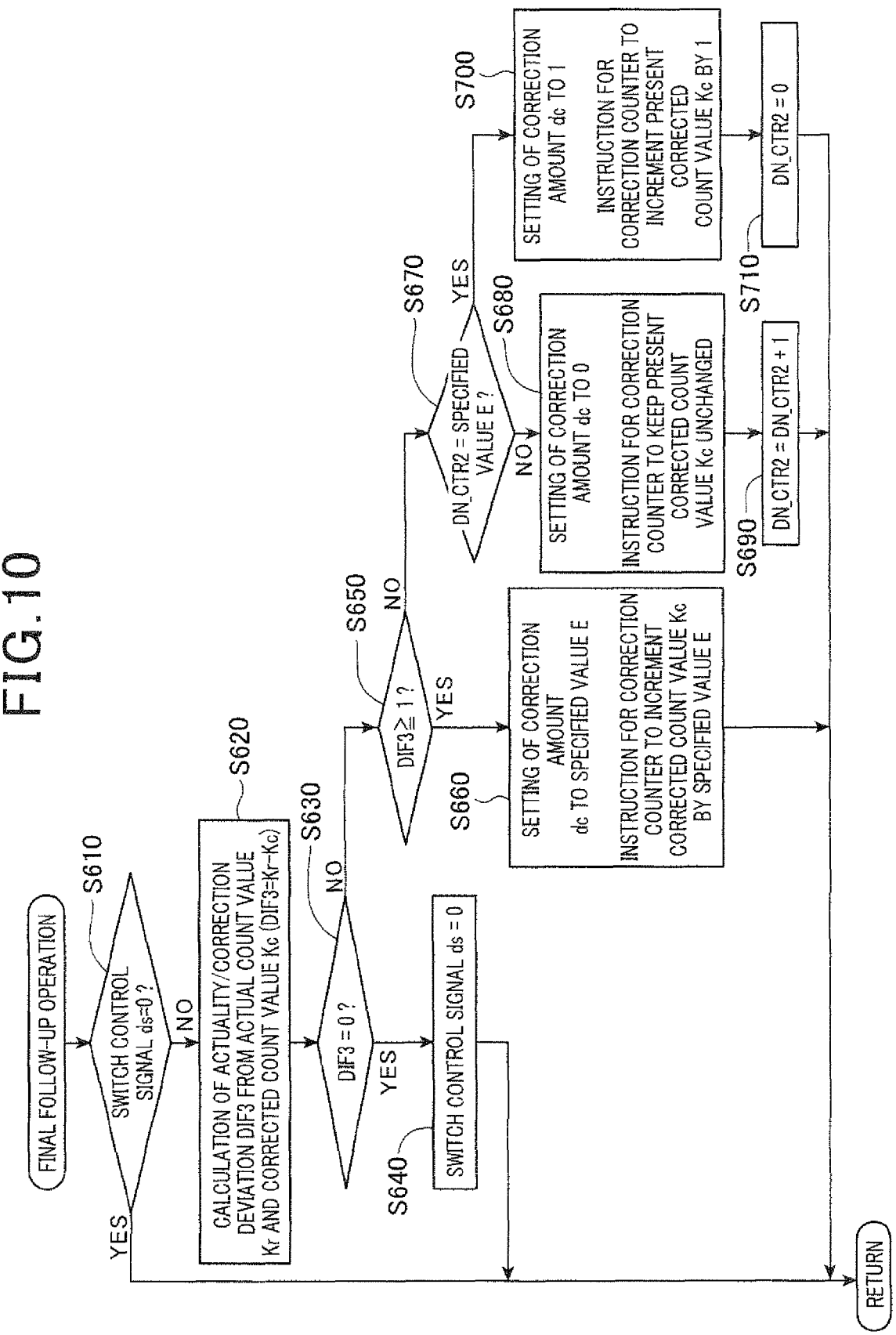
FIG. 10 is a flowchart showing a final follow-up operation performed at step S210 of the correction amount calculating process.

Next, the normal correcting operation and the acceleration/deceleration follow-up operation are explained in detail with reference to FIGS. 8 to 10. First, the normal correcting operation performed at step S190 is explained with reference to the flowchart of FIG. 8. The normal correcting operation begins by subtracting the corrected count value Kc from the predicted count value Kp, and making the subtraction result a prediction/correction deviation DIF2 at step S310. At subsequent step S320, it is determined whether or not the prediction/correction deviation DIF2 is 0 or not, that is, whether or not the corrected count value Kc agrees with the predicted count value Kp.

If the determination result at step S320 is affirmative, the operation proceeds to step S330 where the correction counter 46 is instructed to make no correction to the present count value Kc by setting the correction amount dc to 0, and then the normal correcting operation is terminated.

On the other hand, if the determination result at step S320 is negative, the operation proceeds to step S340 to determine whether the prediction/correction deviation DIF2 is 1 or not. If the determination result at step S340 is affirmative, the operation proceeds to step 350 where the correction counter 46 is instructed to increase the present corrected count value Kc by 1 by setting the correction amount dc to 1, and then the normal correcting operation is terminated. If the determination result at step S340 is negative, that is, if the prediction/correction deviation DIF2 is larger than or equal to 2, the process proceeds to step S360 where the correction counter 46 is instructed to increase the corrected count value Kc presently being outputted by 2 by setting the correction amount dc to 2, and then the normal correcting operation is terminated. When the prediction/correction deviation DIF2 is not 0, since it means that the present corrected count value Kc is delayed from the present predicted count value Kp, the delay is compensated for by correcting the present count value Kc depending on the value of the delay (depending on whether the prediction/correction deviation DIF2 is 1 or 2 or larger) so that the corrected count value Kc agrees with the predicted count value Kp.

Next, the acceleration/deceleration follow-up operation performed at step S200 of the correction amount calculating process shown in FIG. 7 is explained with reference to FIG. 9. This operation begins by determining whether or not the present value of the switch control signal ds is 0 at step S410. As explained in the foregoing, the switch control signal ds is initialized to 1 at each occurrence of the pulse of the Z-phase signal at step S230 (see FIG. 7), however, it may be set to 0 thereafter depending on the rotating state of the motor 1 as explained later.

Accordingly, in the acceleration/deceleration follow-up operation, the value of the switch control signal ds is checked, and the operation proceeds to step S420 if it is 1, while the operation is terminated if it is 0. As explained later, the switch control signal ds is set to 0 when the acceleration or deceleration is large, and it is difficult to cause the corrected count value Kc to follow and agree with the predicted count value Kp, or when the corrected count value Kc agrees with the predicted count value Kp in the final follow-up operation, and it is appropriate to output the actual count value Kr as it is as the angle data φ thereafter. Accordingly, when the switch control signal ds is set to 0 in such circumstances, the switch control signal ds is kept at 0 and the actual count value Kr is outputted as it is as the angle data φ until at least the present rotation cycle of the resolver 13 ends.

If the determination result at step S410 is negative, the operation proceeds to step S420 to determine whether or not the absolute value of the actuality/prediction deviation DIF1 obtained at step S170 shown in FIG. 7 is larger than the specified value C larger than the specified value B. If the determination result at step S420 is affirmative, the operation proceeds to step S430 assuming that the acceleration or deceleration is large, and it is difficult to cause the corrected count value Kc to follow and agree with the predicted count value Kp.

At step S430, it is determined whether or not the actuality/prediction deviation DIF1 is positive, that is whether or not the actual count value Kr significantly leads the predicted count value Kp showing that the rapid accelerating state prevails. If the determination result at step S430 is affirmative, the operation proceeds to step S460 where the switch control signal ds is set to 0 so that the actual count value Kr is outputted as it is as the angle data φ, and then the acceleration/deceleration follow-up operation is terminated.

On the other hand, if the determination result at step S430 is negative, it means that the actual count value Kr is significantly delayed from the predicted count value Kp showing that the rapid decelerating state prevails. In the rapid decelerating state, if the switch control signal ds is set to 0 immediately like in the rapid accelerating state, since the corrected count value Kc decreases smaller than the value presently being outputted, there is a possibility that the rotation of the motor 1 is erroneously determined to have reversed.

Accordingly, in the rapid decelerating state, the actual count value Kr is subtracted by the corrected count value Kc, and the subtraction result is obtained as an actuality/correction deviation DIF3. At subsequent step S450, it is determined whether or not the actuality/correction deviation DIF3 is 0. If the determination result at step S450 is negative, the operation returns to step S440. That is, the operation waits until the count value Kr advances and the actuality/correction deviation DIF3 becomes 0. When the determination result becomes affirmative, the operation proceeds to step S460 to set the switch control signal ds to 0.

If the determination result at step S420 is negative, that is, if it is determined that the accelerating/decelerating state prevails, but it is not the rapid accelerating or decelerating state, the operation proceeds to step S470 where the actual count value Kr is subtracted by the corrected count value Kc, and the subtraction result is obtained as the actuality/correction deviation DIF3. At subsequent step S480, it is determined whether or not the actuality/correction deviation DIF3 is larger than or equal to a specified value D.

The specified value D is an index to determine the extent of the acceleration or deceleration. If the determination result at step S480 is affirmative, the operation proceeds to step S490 assuming that the acceleration ore deceleration is relatively large. At step S490, the correction counter 46 is instructed to increase the corrected count value Kc presently being outputted by the specified value D by setting the correction amount dc to the specified value, and the acceleration/deceleration follow-up operation is terminated.

If the determination result at step S480 is negative, the operation proceeds to step S500 to determine whether or not the actuality/correction deviation DIF3 is smaller than a negative specified value −D (a negative value whose absolute value is equal to D). If the determination result at step S500 is negative, the acceleration/deceleration follow-up operation is terminated assuming that although the accelerating/decelerating state prevails, it is relatively gentle.

If the determination result at step S500 is affirmative, the operation proceeds to step S510 to determine whether or not the first variable DN_CTR agrees with the specified value D, assuming that the deceleration is relatively large.

As explained in the foregoing with respect to step S240 shown in FIG. 7, since the first variable DN_CTR is reset to 0 at each occurrence of the pulse of the Z-phase signal, the first variable DN_CTR is still 0 and has not yet reached specified value D when the determination at step S510 is made for the first time after the first variable DN_CTR is reset.

If the determination result at step S500 is negative, the operation proceeds to step S520 where the correction counter 46 is instructed to make no change to the corrected count value Kc presently being outputted by setting the correction amount dc to 0. Subsequently, the first variable DN_CTR is increased by 1 from its present value at step S530, and then the acceleration/deceleration follow-up operation is terminated.

Thereafter, when the acceleration/deceleration follow-up operation is performed again, and the determination result at step S500 is affirmative (that is, when the state in which relatively large deceleration continues), step S510 and the following steps are performed again.

Accordingly, while the state in which relatively large deceleration continues, the first variable DN_CTR is increased by 1 at each edge change timing of the actual pulse Pr by the process of step S530. When the determination result at step S510 becomes affirmative, that is, when the first variable DN_CTR reaches the specified value ID, the correction counter 46 is instructed to increase the corrected count value Kc presently being outputted by 1 by setting the correction amount dc to 1. At subsequent step S550, the first variable DN_CTR is reset to 0, and then the acceleration/deceleration follow-up operation is terminated.

As explained above, when the state in which the deceleration is relatively large prevails, and the actuality/correction deviation DIF3 is smaller than the specified value −D, the corrected count value Kc is incremented by 1 each time the edge change of the actual pulse Pr occurs D times, that is, each time the rotation angle of the resolver 13 represented by the actual count value Kr increases by D times the resolution angle.

The specified value D, which is an index to determine the extent of the acceleration/deceleration as described above, is also an index to determine the followability when the corrected count value Kc is caused to follow the actual count value Kr during the accelerating/decelerating state. That is, when the specified value D is set larger, it is possible to cause the corrected count value Kc to appropriately follow the actual count value Kr during the accelerating state even if the acceleration is larger, and to reduce the difference between the corrected count value Kc and the actual count value Kr at an appropriate rate during the decelerating state even if the deceleration is larger.

The specified value D is determined as appropriate. For example, in view of that the incremental value of the correction amount Kc is 2 at a maximum during the normal correcting operation shown in FIG. 8, it is preferable to set the specified value D larger than 2 (integer larger than or equal to 3).

Incidentally, the specified value D is used as both the incremental value of the corrected count value Kc at step S490 and the comparison reference with which the first variable DN_CTR is compared. However, each of them may be set to a value different from the specified value D.

Next, the final follow-up operation performed at step S210 of the correction amount calculating process shown in FIG. 7 is explained with reference to FIG. 10. This operation begins by determining whether or not the present value of the switch control signal ds is 0 at step S610. If the determination result at step SS610 is negative, that is, if the present value of the switch control signal ds is 1, the operation proceeds to step S620. On the other hand, if the determination result at step SS610 is affirmative, the final follow-up operation is terminated.

At step S620, the actual count value Kr is subtracted by the corrected count value Kc, and the subtraction result is obtained as the actuality/correction deviation DIF3. At subsequent step S630, it is determined whether or not the actuality/correction deviation DIF3 is 0. If the determination result at step S630 is affirmative, the operation proceeds to step S640 to set the switch control signal ds set to 0, and then the final follow-up operation is terminated. As a result, the actual count value Kr is outputted as it is as the angle data ϕ at each edge change timing of the actual pulse Pr until the pulse of the the Z-phase signal occurs next time.

If the determination result at step S630 is negative, the operation proceeds to step S650 to determine whether or not the actuality/correction deviation DIF3 is 1 or larger, that is, whether or not the actual count value Kr leads the corrected count value Kc. If the determination result at step S650 is affirmative, the operation proceeds to step S660 where the correction counter 46 is instructed to increase the corrected count value Kc presently being outputted by a specified value E by setting the correction amount dc to the specified value E, and then the final follow-up operation is terminated.

If the determination result at step S650 is negative, that is, when the actual count value Kr is delayed from the corrected count value Kc, the operation proceeds to step 670 to determine whether or not the second variable DN_CTR2 agrees with the specified value E.

As explained in the foregoing with respect to step S240 shown in FIG. 7, since the second variable DN_CTR2 is reset to 0 at each occurrence of the pulse of the Z-phase signal, the second variable DN_CTR2 is still 0 and has not yet reached specified value E when the determination at step S670 is made for the first time after the second variable DN_CTR2 is reset.

If the determination result at step S670 is negative, the operation proceeds to step S680 where the correction counter 46 is instructed to make no change to the corrected count value Kc presently being outputted by setting the correction amount dc to 0. Subsequently, the second variable DN_CTR2 is increased by 1 from its present value at step S690, and then the final follow-up operation is terminated.

Thereafter, when the final follow-up operation is performed again, and the determination result at step S650 is negative (that is, when the state in which the actual count value Kr is delayed from the corrected count value Kc continues), step S670 and the following steps are performed again.

Accordingly, while the state in which the actual count value Kr is delayed from the count value Kc continues, the second variable DN_CTR2 is incremented by 1 at each edge change timing of the actual pulse Pr by the process of step S690. When the determination result at step S670 becomes affirmative, that is, when the second variable DN_CTR2 reaches the specified value E, the operation proceeds to step S700 where the correction counter 46 is instructed to increase the corrected count value Kc presently being outputted by 1 by setting the correction amount dc to 1. At subsequent step S710, the second variable DN_CTR2 is reset to 0, and then the final follow-up operation is terminated.

As explained above, when the actual count value Kr is delayed from the corrected count value Kc, the corrected count value Kc is incremented by 1 each time the edge change of the actual pulse Pr occurs E times, that is, each time the rotation angle of the resolver 13 represented by the actual count value Kr increases by E times the resolution angle.

Incidentally, the specified value E is used as both the incremental value of the corrected count value Kc at step S660 and the comparison reference with which the second variable DN_CTR2 is compared. However, each of them may be set to a value different from the specified value E.

As explained above, in the final follow-up operation, priority is given to cause the corrected count value Kc to agree with the actual correction value Kr, and if they agree with each other, the actual count value Kr is outputted as it is as the angle data ϕ until the pulse of the Z-phase signal occurs next time. On the other hand, if they do not agree with each other, the corrected count value Kc is incremented at an appropriate rate in accordance with the difference therebetween until the corrected count value Kc coincides with the actual count value Kr.

The specified value E is determined as appropriate. However, it is preferable to set the specified value E to such a value that the corrected count value Kc can coincide with the actual count value kr before the resolver 13 rotates one turn from the timing of occurrence of the pulse of the Z-phase signal.

Figure 11:
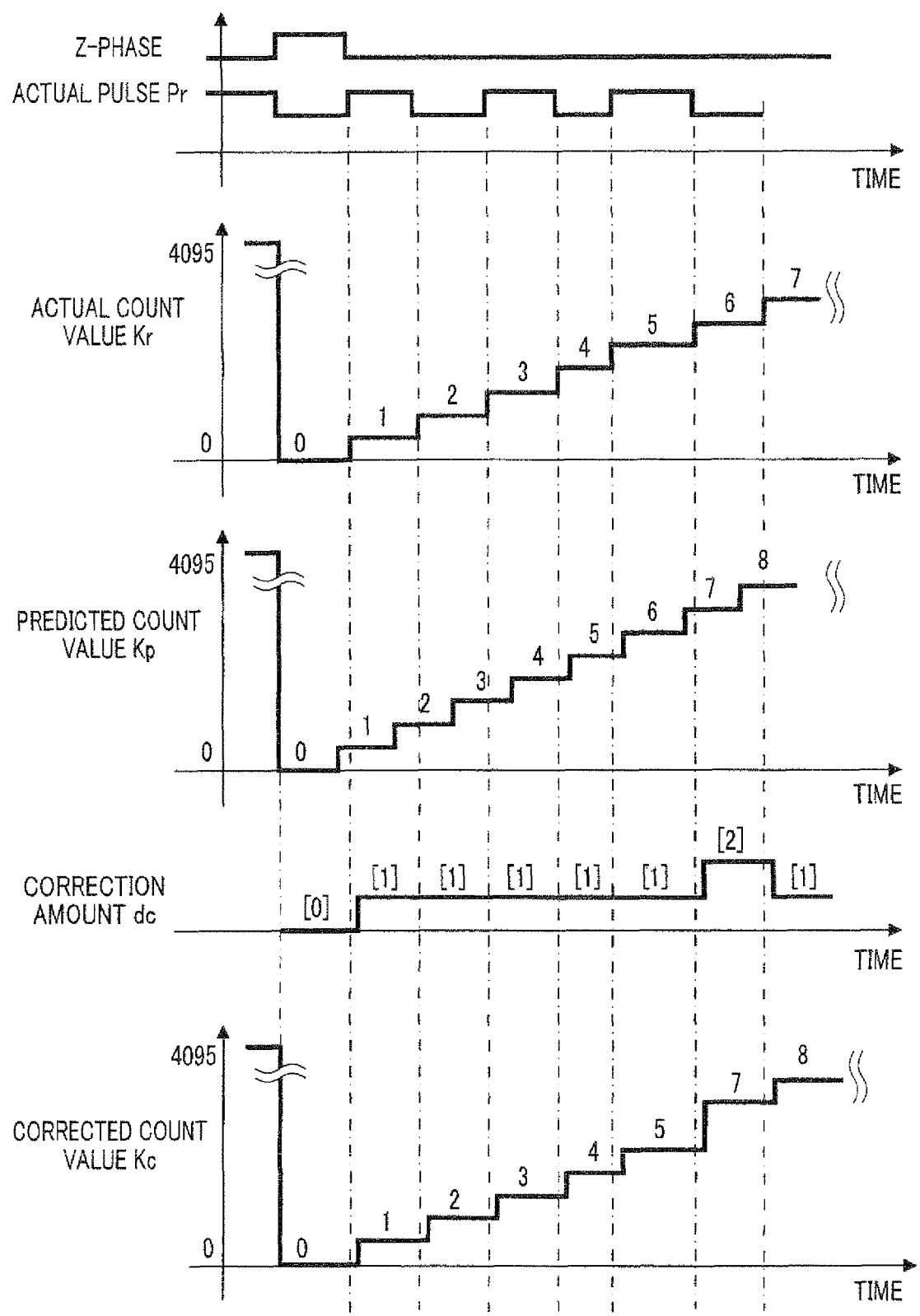
FIG. 11 is an explanatory view explaining an example of the operations of respective counters and the correction amount calculating section included in the error correcting section during one cycle time of the resolver from start of its rotation.
Figure 12:
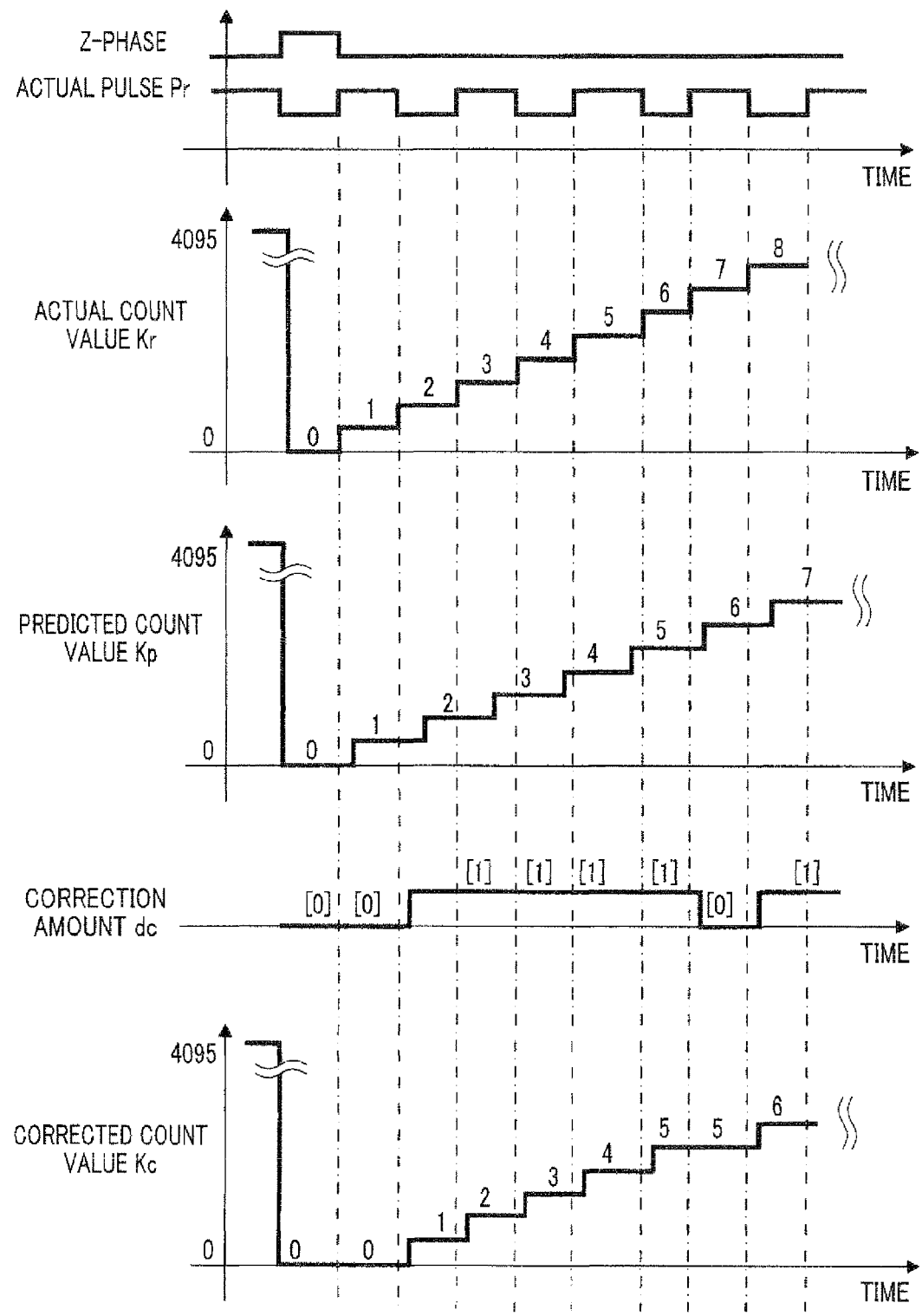
FIG. 12 is an explanatory view explaining an example of the operations of the respective counters and the correction amount calculating section during one cycle time of the resolver from start of its rotation.

Next, an example of the operations of the counters 42, 44 and 46 and the correction amount calculating section 45 from the start of rotation of the resolver 13 during one rotation cycle of the resolver 13 is explained with reference to FIGS. 11 and 12. Each of FIGS. 11 and 12 shows an early stage of the rotation cycle of the resolver 13 before the resolver 13 reaches the final rotation area (that is, before the actual count value Kr is smaller than the specified value A). Also, each of FIGS. 11 and 12 shows the state in which the absolute value of the actuality/prediction deviation DIF1 is smaller than the specified value B and the normal correcting operation (step S190 shown in FIG. 7 whose detail is shown in FIG. 8) is being performed at least within the range shown in these figures (within the range in which the actual count value Kr is between 0 and 7 in the case of FIG. 11, and within the range in which the actual count value Kr is between 0 and 8 in the case of FIG. 12). Accordingly, the explanation is made also with reference to FIG. 8 as necessary.

FIG. 11 shows an example of the operations at an early stage in the case where the actual count value Kr is being delayed from the predicted count value Kp. In the example shown in FIG. 11, each of the respective count values Kr, Kp, and Kc and the correction amount dc is reset to 0 by occurrence of the pulse of the Z-phase signal. After the reset, the actual count value Kr is incremented by one at each edge change timing of the actual pulse Pr.

Figure 8:
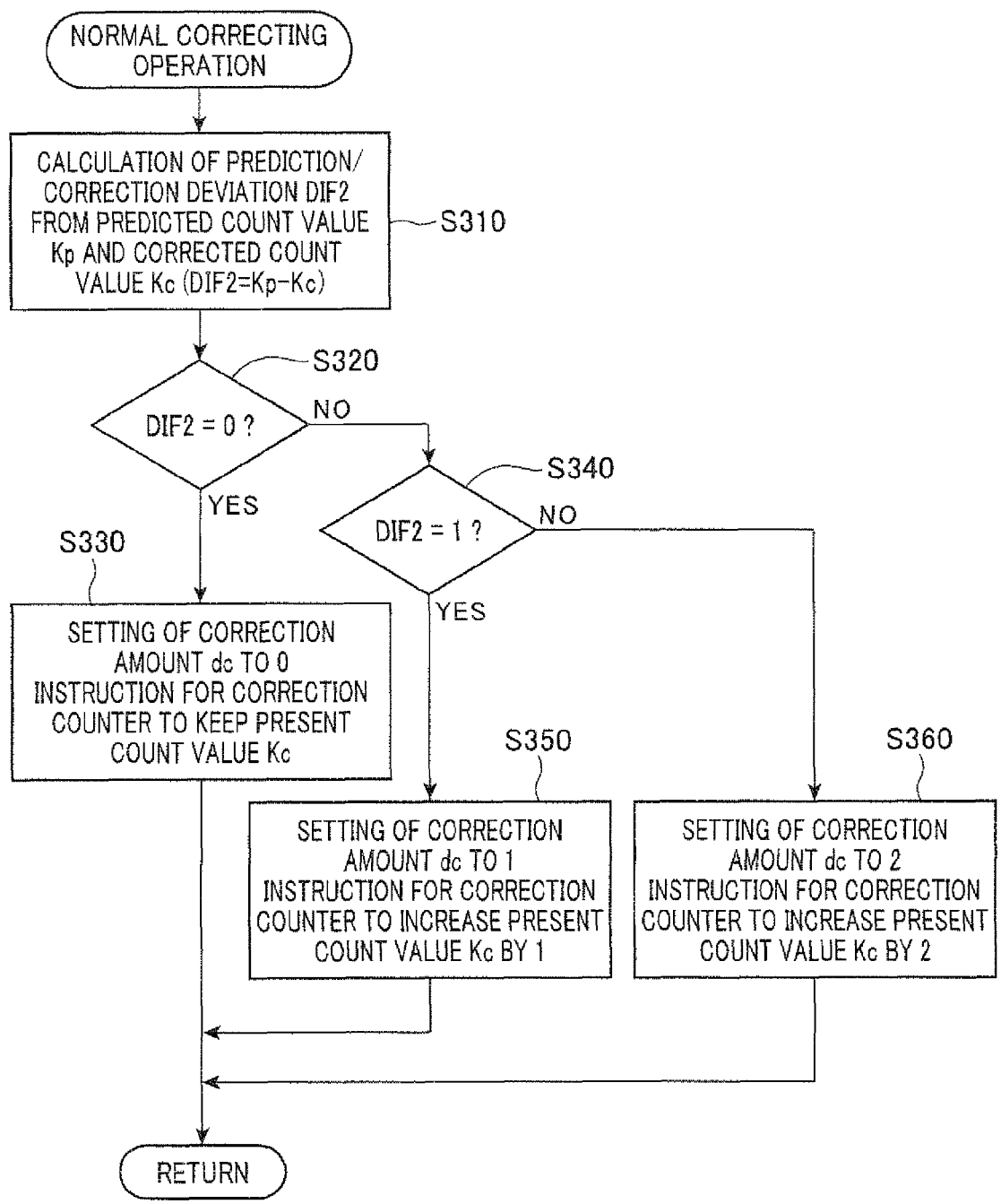
FIG. 8 is a flowchart showing a normal correcting operation performed at step S190 of the correction amount calculating process.

When the actual count value Kr is increased from 0 to 1, since the prediction/correction deviation DIF2 is 1, the correction amount dc is set to 1, as a result of which the corrected count value Kc is incremented by 1 to become 1 (step S350 shown in FIG. 8). Thereafter, the corrected count value Kc is successively incremented by 1 until the actual count value Kr is increased up to 5.

When the actual count value Kr is incremented from 5 to 6, the predicted count value Kp is 7, while the corrected count value Kc is 5. Accordingly, the difference therebetween, that is, the prediction/correction deviation DIF2 is 2. As a result, since the correction amount dc is set to 2, the corrected count value Kc is incremented by 2 to become 7 (step S360 shown in FIG. 8), and accordingly, it coincides with the predicted count value Kp.

FIG. 12 shows an example of the operations at an early stage in the case where the actual count value Kr is leading the predicted count value Kp. Like in the example shown in FIG. 11, also in this example, each of the respective count values Kr, Kp, and Kc and the correction amount dc is reset to 0 by occurrence of the pulse of the Z-phase signal. After the reset, the actual count value Kr is incremented by one at each edge change timing of the actual pulse Pr.

When the actual count value Kr is incremented from 0 to 1, since the prediction/correction deviation DIF2 is 1, the correction amount dc is set to 1, as a result of which the corrected count value Kc is kept unchanged at the present value of 0 (step S330 shown in FIG. 8).

When the actual count value Kr is increased from 1 to 2, since the prediction/correction deviation DIF2 is 1, the correction amount dc is set to 1, as a result of which the corrected count value Kc is increased by 1 to become 1 (step S350 shown in FIG. 8). Thereafter, the actual count value Kr is successively incremented by 1 until the actual count value Kr is incremented up to 6.

When the actual count value Kr is incremented from 6 to 7, since the predicted count value Kp and the corrected count value Kc are both 5, the difference therebetween, that is, the prediction/correction deviation DIF2 is 0. Accordingly, the correction amount dc is set to 0, as a result of which the corrected count value Kr is kept unchanged at the present value of 5.

As explained above, in the normal correcting operation performed when the actuality/prediction deviation DIF1 is smaller than the specified value B, the corrected count value Kc is successively incremented (updated) so that the corrected count value Kc coincides with the predicted count value Kp.

As described in the foregoing, the traction motor control apparatus 7 (ECU 7) includes the RD converting section 16 to generate the A-phase, B-phase and Z-phase signals on the basis of the rotation signals Sa and Sb outputted from the resolver 13 and received in rotation angle detecting section 35, and the error correcting section 17 to correct the respective phase signals (especially, the A-phase and B-phase signals) and output the correction result as the angle data φ.

The error correcting section 17 generates the actual pulse Pr on the basis of the A-phase and B-phase signals, and counts this actual pulse Pr to output the actual count value Kr. Further, the error correcting section 17 generates the predicted pulse Pp on the basis of the Z-phase signal, and counts this predicted pulse Pp to output the predicted count value Kp.

The correction amount calculating section 45 performs the normal correcting operation when the absolute value of the actuality/prediction deviation DIF1 is smaller than or equal to the specified value B. In this normal correcting operation, the corrected count value Kc from the correction counter 46 is successively incremented (updated) at each edge change timing of the actual pulse Pr until it coincides with the predicted count value Kp from the predicted pulse counter 44.

Accordingly, even when the rotation detection signals Sa and Sb outputted from the resolver 13 include an error due to various factors such as manufacturing tolerance, it is possible to generate the reliable angle data φ in which the error is corrected to be used in power supply control of the motor 1. Hence, this embodiment does not need a large capacity memory required in the conventional error correcting method described in the foregoing Patent document 3, and accordingly, is capable of improving control accuracy of the motor 1 without increasing hardware scale.

Further, in the normal correcting mode, the present corrected count value Kc is kept unchanged when the prediction/correction deviation DIF2 is 0, while, when the present corrected count value Kc is delayed from the predicted count value Kp, the present corrected count value Kc is successively incremented by the incremental value depending on the delay therebetween. This makes it possible to update the corrected count value Kc in more reliably during the normal correcting operation.

For example, by performing the normal correcting operation, even if the respective phase signals including error are outputted from the RD converting section 16 when the electric vehicle is running at a constant speed and a vehicle driver keeps the accelerator pedal-pressing force unchanged, since the error is corrected, it is possible to prevent the vehicle driver and passengers from feeling uncomfortable.

The correction amount calculating section 45 also performs the acceleration/deceleration follow-up operation when the absolute value of the actuality/prediction deviation DIF1 is not below the specified value B, assuming that the motor 1 is in the accelerating or decelerating state. In the acceleration/deceleration follow-up operation, the corrected count value Kc is incremented by the specified value D at each edge change timing of the actual pulse Pr when it is determined that the accelerating state prevails in which the actuality/correction deviation DIF3 is larger than the specified value D. This makes it possible to cause the corrected count value Kc delayed from the actual count value Kr to rapidly follow the actual count value Kr even when the motor 1 is in the accelerating state.

On the other hand, when the decelerating state in which the actuality/correction deviation DIF3 is smaller than the specified value D prevails, the corrected count value Kc is successively incremented by 1 each time the edge change of the actual pulse Pr occurs D times. This makes it possible to cause the corrected count value Kc to appropriately follow the actual count value Kr even when the motor 1 enters the accelerating state and accordingly the corrected count value Kc leads the actual detected rotation angle.

In the acceleration/deceleration follow-up operation, the actual count value Kr is outputted as it is as the angle data φ when the acceleration or deceleration is very large. This makes it possible for controllability of the motor 1 to be prevented from degrading even when rapid acceleration or deceleration occurs.

Especially, when the deceleration is very large, the as-is actual count value Kr is not immediately outputted as the angle data φ, but it is waited until the actual count value Kr catches up with the corrected count value Kc before it is outputted as the angle data φ. This makes it possible to prevent the angle data φ from changing to show as if the motor 1 was rotating reversely even when rapid deceleration occurs, and to smoothly switch the angle data φ from the corrected count value Kc to the actual count value Kr.

The correction amount calculating section 45 also performs the final follow-up operation when the actual count value Kr exceeds the specified value A, that is, when the rotational angle of the resolver 13 has reached the final rotation area within the rotation cycle of the resolver 13. In the final follow-up operation, the actual count value Kr is outputted as it is as the angle data φ when the actuality/correction deviation DIF3 is 0. This makes it possible to prevent abrupt change of the angle data φ during transition to the next rotation cycle of the resolver 13.

In the final follow-up operation, the corrected count value Kc is successively incremented by the specified value E when the actuality/correction deviation DIF3 is 1 or larger. By successively incrementing the corrected count value Kc by the specified value B, it is possible to cause the angle data φ to reliably and smoothly follow the actual count value Kr in the final rotation area.

On the other hand, when the actuality/correction deviation DIF3 is negative, the corrected count value Kc is successively incremented by one each time the edge change of the actual pulse Pr occurs E times. This makes it possible to gradually reduce the difference between the corrected count value Kc and the actual count value Kr by increasing the corrected count value Kc at a smaller rate even when the actual count value Kr is delayed from the corrected count value Kc in the final rotation area.

It is a matter of course that various modifications can be made to the above embodiment as described below.

The above embodiment is configured to generate the predicted pulse Pp by predicting the predicted pulse width ΔT on the basis of a result of measurement of the pulse generation interval of the Z-phase signal as explained with reference FIG. 5. However, if the predicted pulse width ΔT is predicted on the basis of a result of measurement of only the immediately previous pulse generation interval of the Z-phase signal, the prediction accuracy of the predicted pulse width ΔT (and accordingly the accuracy of the predicted pulse Pp) may be degraded, because the accelerating or decelerating state is not reflected on the prediction of the predicted pulse width ΔT when the motor 1 is in the accelerating or decelerating state.

Accordingly, the embodiment may be modified such that in order to predict the predicted pulse width ΔT more accurately taking into account the speed variation of the motor 1, the time elapsed for the resolver 13 to rotate one turn are measured at two different timings, and the predicted pulse width ΔT is predicted taking into account the difference between the two times measured at the two different timings. Here, the method to predict the predicted pulse width ΔT (and accordingly, to generate the predicted pulse Pp) taking into account a speed variation of the motor 1 is explained in the following with reference to FIG. 13.

In this method, the full rotation angle range of one rotation cycle of the resolver 13 is divided into a plurality of divided angle ranges at an angle interval of θx. In the example shown in FIG. 13, since the angle interval θx is 45 degrees, the full rotation angle range of one rotation cycle from 0 to 360 degrees are divided into 8 divided angle ranges each having the angle width of 45 degrees.

For each of the 8 divided angle ranges, a time elapsed from when the resolver 13 enters one of the 8 divided angle ranges to when the resolver 13 again enters the same one of the 8 divided angle ranges next time is measured on the basis of the rotational angle represented by the actual count value Kr. The time measured at the present timing is set as a present elapsed time, and the time measured at the immediate previous timing (the timing preceding the present timing by the angle interval θx of 45 degrees) is set as a previous elapsed time. Subsequently, the present elapsed time is subtracted by the previous elapsed time, and the subtraction result is multiplied by the number of the divided angle ranges (8 in this embodiment). This multiplication result is a value quantitatively representing the speed variation (speed variation component) of the motor 1.

A predicted cycle time Tp which is a prediction of the time necessary for the resolver 13 to rotate one turn can be obtained by adding the speed variation component to the present elapsed time. This predicted cycle time Tp reflects the speed variation of the motor 1 at present time. By dividing the predicted cycle time Tp by the resolution R, the predicted pulse width reflecting the speed variation of the motor 1 can be obtained.

After the predicted pulse width is thus obtained, the predicted pulse Pp is generated to have this predicted pulse width until the rotational angle represented by the actual count value Kr reaches the next divided angle range Next, an example of the above described method to obtain the predicted pulse width taking into account the speed variation of the motor 1, and generate the predicted pulse Pp is explained with reference to FIG. 13. In this example, at time $t0_{n+1}$ (when the rotational angle is at 0 degrees), the predicted cycle time Tp is calculated in accordance with the following equation (1), where Ta is the previous elapsed tme, and Ta is the present elapsed time.

$$Tp = Tb + (Tb - Ta) \cdot 8 \quad (1)$$

By dividing the calculated predicted cycle time Tp by the precision R, the predicted pulse width is obtained. The predicted pulse Ppb having the calculated predicted pulse width starts to be generated from time $t0_{n+1}$ to until time $t1_{n+1}$ at which the rotational angle reaches the next divided angle range.

At time $t1_{n+1}$ (when the rotational angle is at 45 degrees), the predicted cycle time Tp is calculated in the same way as above. In more detail, the predicted cycle time Tp is calculated in accordance with the following equation (2), where Tc is the present elapsed time at time $t1_{n+1}$ and Tb is the previous elapsed time.

$$Tp = Tc + (Tc - Tb) \cdot 8 \quad (2)$$

By dividing the calculated predicted cycle time Tp by the precision R, the predicted pulse width is obtained. The predicted pulse Ppc having the calculated predicted pulse width starts to be generated from time $t1_{n+1}$ to until time $t2_{n+1}$ at which the rotational angle reaches the next divided angle range when the rotational angle is at 90 degrees.

Thereafter, each time the rotational angle represented by the actual count value Kr reaches the next divided angle range, prediction of the predicted cycle time Tp, calculation of the predicted pulse width and generation of the predicted pulse Pp having the predicted pulse width are performed in the same way as above.

Figure 13:
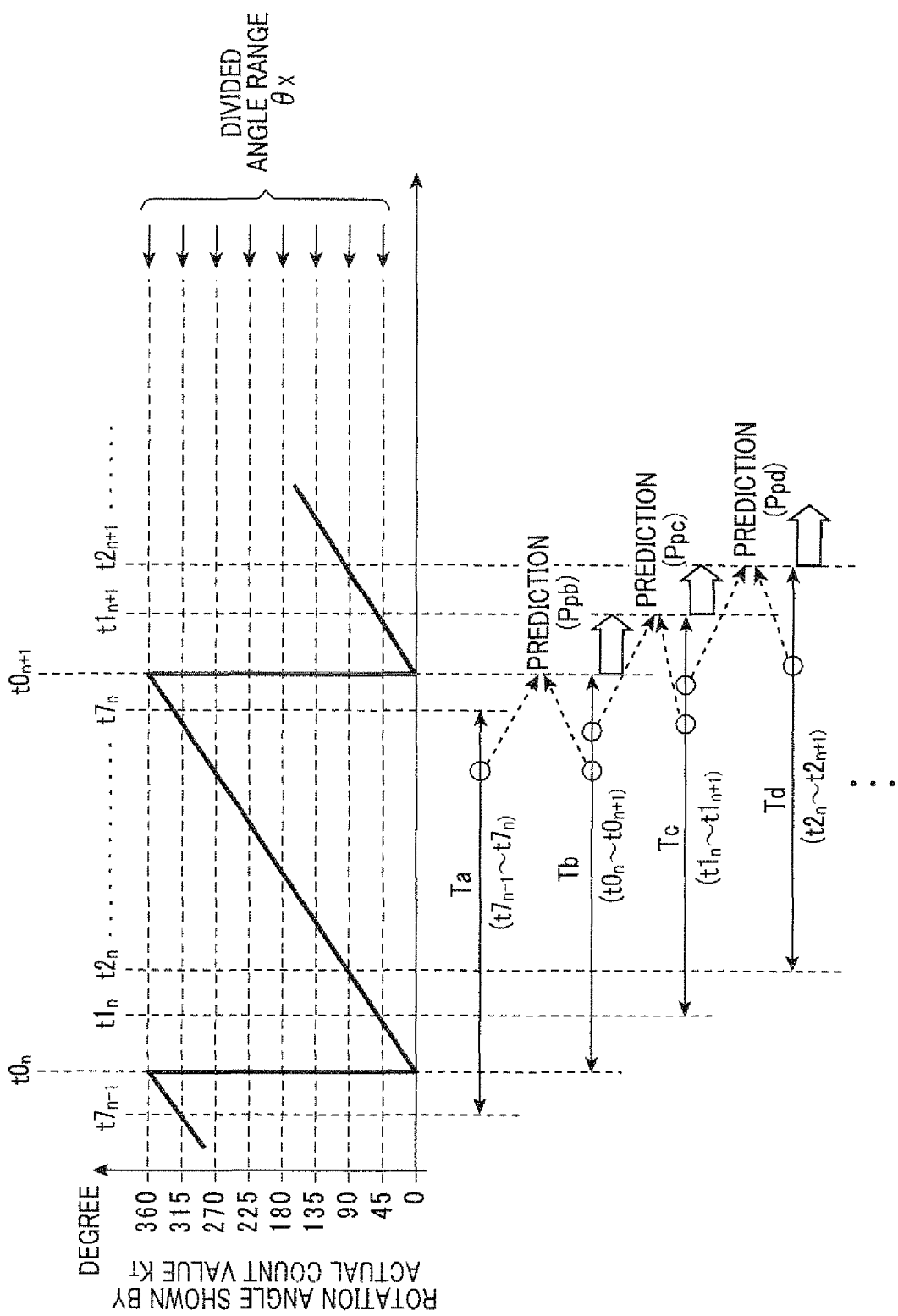
FIG. 13 is an explanatory view explaining a method of generating the predicted pulse taking account of velocity variation performed by the traction motor control apparatus of this embodiment.

In the example shown in FIG. 13, the angle interval (angle width) of the divided angle ranges is 45 degrees, however, it may be determined as appropriate. For example, the predicted cycle time Tp may be calculated by the above described method each time the resolver 13 turns one rotation (360 degrees). The number of the divided angle ranges may be determined at any integer larger than or equal to 2. However, it is preferable that the number of divided angle ranges is a power of 2.

In the above embodiment, in the correction amount calculating process shown in FIG. 7, the determination whether or not the absolute value of the actuality/prediction deviation DIF1 is smaller than the specified value B, that is, whether or not the acceleration/deceleration state prevails, is made at each edge change timing of the actual pulse Pr while the actual count value Kr is smaller than the specified value A (step S180). However, this determination does not necessarily have to be made at each edge change timing of the actual pulse Pr. For example, the correction amount calculating process may be modified such that this process normally proceeds from step S170 to step S190, and the determination at step S180 is made each time the rotation angle increases by a predetermined amount (that is, each time the edge change of the actual pulse Pr occurs a predetermined times).

In the above embodiment, the detection angle data inputted to the error correcting section 17 is constituted by the pulse signals of the A-phase, B-phase and Z-phase signals outputted from the RD converting section 16, and is corrected to remove an error due to manufacturing tolerance of the resolver 13 etc. on the basis of theses respective phase signals by the above described method. However, the detection angle data to be corrected is not limited to the pulse signals. It may be any data showing the rotational angle.

Inputting data showing the rotational angle to the error correcting section 17 is equivalent to directly inputting the actual count value Kr to the error correcting section 17. Accordingly, the exclusive OR operating section 41 and the actual pulse counter 42 are not needed in the error correcting section 17 when the actual count value Kr is inputted to the error correcting section 17. However, in this case, it is necessary to generate a signal equivalent to the Z-phase signal, and input this signal to the predicted angle pulse signal generating section 43, predicted pulse counter 44 and correction counter 46, or alternatively to constitute the predicted angle pulse signal generating section 43, predicted pulse counter 44 and correction counter 46 to be capable of determining the timing of one cycle of the resolver 13 on the basis of the data inputted thereto.

In the above embodiment, the means to detect the rotational angle of the motor 1 is constituted of the resolver 13 and the RD converting section 16. However, the means is not limited thereto.

For example, the means may be an incremental encoder, an absolute encoder, or a sensor constituted of a combination of a vertical hall element and magneto-resistive element configured to output a signal depending on the rotational angle as disclosed in the foregoing Patent document 2. The means may have any structure as long as it can output, each time the motor rotates by a predetermined angle, a signal indicative of that effect, and output, each time the motor rotates a reference angle (360/n degrees, n being an integer larger than or equal to 1) larger than this predetermined angle, a signal indicative of that effect.

In the above embodiment, the rotation angle detecting section 35 constituted of the RD converting section 16 and the error correcting section 17 is provided independently of the microcomputer 37. However, the error correcting section 17 may be included in the microcomputer 37, or both of the RD converting section 16 and the error correcting section 17 (that is, the entire of the rotation angle detecting section 35) may be included in the microcomputer 37.

The above embodiment shows an example in which the present invention is applied to an electric vehicle. However, the present invention is applicable to any vehicle having an electric motor as a traction power source thereof, such as a hybrid vehicle having an internal combustion engine and an electric motor as a traction power source thereof, and also an electric train.

The above explained preferred embodiments are exemplary of the invention of the present application which is described solely by the claims appended below. It should be understood that modifications of the preferred embodiments may be made as would occur to one of skill in the art.

What is claimed is:

1. A traction motor control apparatus for a vehicle that is provided with a traction motor as a traction power source and a rotation angle detection means that outputs first rotation data each time the motor rotates by a certain angle to show that effect, outputs second rotation data each time the motor rotates by a reference angle of 360/n degrees (n being an integer larger than or equal to 1) larger than the certain angle to show to that effect, and controls power supply to the motor using the first and second rotation data outputted from the rotation angle detection means, the traction motor control apparatus including a correction means for correcting the first rotation data and outputting a correction result as corrected rotation data, and being configured to control power supply to the motor based on the corrected rotation data outputted from the correction means, wherein the correction means comprises:

a certain angle rotation time prediction means that measures, at each timing at which an actual detected angle as an actual rotation angle of the motor shown by the first and second rotation data changes by a predetermined prediction angle width, an elapsed time from when the actual detected angle reached a value earlier than a present value by the reference angle to when the actual detected angle has reached the present value, and predicts a time necessary for the motor to rotate by the certain angle based on the measured elapsed time thereafter;

a predicted rotation data generation means that assumes that the motor has rotated by the certain angle during elapse of the predicted time each time the predicted time predicted by the certain angle rotation time prediction means elapses from an angle prediction start timing as an output timing of the second rotation data, and generates the predicted rotation angle as predicted rotation data; and a corrected rotation data update means that compares a predicted rotation angle shown by the predicted rotation data presently generated by the predicted rotation data generation means with a corrected rotation angle shown by the corrected rotation data presently being outputted from the correction means, updates the corrected rotation data to be outputted such that the corrected rotation angle and the predicted rotation angle coincide with each other at each output timing of the first rotation data, and initializes the corrected rotation data at each output timing of the second rotation data such that the corrected rotation angle shown by the corrected rotation data has a same value with the predicted rotation angle shown by the predicted rotation data and the actual detected angle.

2. The traction motor control apparatus for a vehicle according to claim 1, wherein the corrected rotation data update means includes a prediction/correction deviation calculation means that calculates, as a prediction/correction deviation, a deviation between the predicted rotation angle and the corrected rotation angle, keeps the corrected rotation data presently being outputted unchanged if the prediction/correction deviation is 0 based on a calculation result by the prediction/correction deviation calculation means, and updates the corrected rotation data presently being outputted to data that shows a rotation angle increased from the present corrected rotation angle by an increase amount corresponding to the prediction/correction deviation if the prediction/correction deviation is not 0.

3. The traction motor control apparatus for a vehicle according to claim 2, wherein the corrected rotation data update means is configured to update the corrected rotation data such that the corrected rotation angle is a positive integral multiple of the certain angle, and update, if the prediction/correction deviation calculated by the prediction/correction deviation calculation means is not 0, the corrected rotation data presently being outputted to data that shows, if the corrected rotation angle is smaller than the predicted rotation angle by the certain angle, a rotation angle increased from the present corrected rotation angle by the certain angle, and shows, if the corrected rotation angle is larger than the predicted rotation angle by larger than the certain angle, a rotation angle increased from the corrected rotation angle by twice the certain angle.

4. The traction motor control apparatus for a vehicle according to claim 1, further comprising an actual rotation data generation means that generates actual rotation data showing the actual detected angle with respect to the angle prediction start timing based on the first and second rotation data,
the corrected rotation data update means including:
an actuality/prediction deviation calculation means that calculates, as an actuality/prediction deviation, a deviation between the actual detected angle and the predicted rotation angle at each of determination timings predetermined from within the output timings of the first rotation data;
a first actuality/prediction deviation determination means that determines whether or not the actuality/prediction deviation calculated by the actuality/prediction deviation calculation means is larger than a predetermined first determination angle; and
a first actuality/correction deviation calculation means that calculates, as an actuality/correction deviation, a deviation between the actual detected angle and the corrected rotation angle if the actuality/prediction deviation is determined to exceed the first determination angle by the first actuality/prediction deviation determination means;
the corrected rotation data being updated such that the actuality/correction deviation becomes smaller than a predetermined specified angle if the actuality/prediction deviation is determined to exceed the first determination angle by the first actuality/prediction deviation determination means.

5. The traction motor control apparatus for a vehicle according to claim 4, wherein the corrected rotation data update means
includes an acceleration state determination means that determines, based on the actuality/correction deviation calculated by the first actuality/correction deviation calculation means, whether or not there prevails a specified acceleration state in which the actual detected angle is larger than the corrected rotation angle by larger than the first specified angle if the actuality/prediction deviation is determined to exceed the first determination angle by the first actuality/prediction deviation determination means, and
updates the corrected rotation data presently being outputted to data that shows a rotation angle increased from the present corrected rotation angle by the first specified angle if the specified acceleration state is determined to prevail by the acceleration state determination means.

6. The traction motor control apparatus for a vehicle according to claim 5, wherein the corrected rotation data update means
includes a deceleration state determination means that determine, based on the actuality/correction deviation calculated by the first actuality/correction deviation calculation means, whether or not there prevails a specified deceleration state in which the actual detected angle is smaller than the corrected rotation angle by larger than the first specified angle if the actuality/correction deviation is determined to exceed the first determination angle by the first actuality/prediction deviation determination means, and
updates, if the specified deceleration state is determined to prevail by the deceleration state determination means, the corrected rotation data such that the corrected rotation angle increases in such a change rate that the corrected rotation angle increases by the certain angle while the actual detected angle increases by the certain angle multiplied by a first specified multiple number at each determination timing, at least while the specified deceleration state continues to be determined to prevail.

7. The traction motor control apparatus for a vehicle according to claim 4, wherein the corrected rotation data update means
includes a second actuality/prediction deviation determination means that determines whether or not the actuality/prediction deviation exceeds a second determination angle larger than the first determination angle, and
if the actuality/prediction deviation is determined to exceed the second determination angle, outputs the actual rotation data directly as the corrected rotation data at each output timing of the first rotation data thereafter until the second rotation data is outputted next time.

8. The traction motor control apparatus for a vehicle according to claim 7, wherein the corrected rotation data update means includes:
an actuality/prediction comparison determination means that determines whether or not the actual detected angle is larger than the predicted rotation angle based on a calculation result by the actuality/prediction deviation calculation means; and
a wait means that waits until the actual detected angle reaches the corrected rotation angle presently being outputted if the actuality/prediction deviation is determined to exceed the second determination angle by the second actuality/prediction deviation determination means, and the actual detected angle is determined to be smaller than the predicted rotation angle by the actuality/prediction comparison determination means,
the actual rotation data being outputted directly as the corrected rotation data after the actual detected angle reaches the corrected rotation angle by waiting by the wait means until the second rotation data is outputted next time.

9. The traction motor control apparatus for a vehicle according to claim 1, further comprising an actual rotation data generation means that generates actual rotation data showing the actual detected angle with respect to the angle prediction start timing based on the first and second rotation data,
the corrected rotation data update means including:
a boundary angle determination means that determines whether or not the actual detected angle exceeds a boundary angle smaller than the reference angle; and
a second actuality/correction deviation calculation means that calculates, as an actuality/correction deviation, a deviation between the actual detected angle and the corrected rotation angle if the actual detected angle is determined to exceed the boundary angle,
the actual rotation data being outputted directly as the corrected rotation data at each output timing of the first rotation data if the actuality/correction deviation calculated by the second actuality/correction deviation calculation means is 0 until the second rotation data is outputted next time.

10. The traction motor control apparatus for a vehicle according to claim 9, wherein the corrected rotation data update means determines whether or not the actual detected angle is larger than the corrected rotation angle based on the actuality/correction deviation if the actuality/correction deviation calculated by the second actuality/correction deviation calculation means is not 0, and updates the corrected rotation data presently being outputted to data that shows a rotation angle increased from the present corrected rotation angle by a predetermined second specified angle if the actual detected angle is determined to be larger than the corrected rotation angle.

11. The traction motor control apparatus for a vehicle according to claim 9, wherein the corrected rotation data update means determines whether or not the actual detected angle is smaller than the corrected rotation angle based on the actuality/correction deviation if the actuality/correction deviation calculated by the second actuality/correction deviation calculation means is not 0, and generates the corrected rotation data so that the corrected rotation angle increases by the certain angle while the actual detected angle increases by the certain angle multiplied by a second multiple number at each output timing of the first rotation data at least while the actual detected angle continues to be determined to be smaller than the corrected rotation angle.

12. The traction motor control apparatus for a vehicle according to claim 1, wherein the certain angle rotation time prediction means calculates a predicted elapsed time by subtracting, at each of timings at which the actual detected angle changes by the prediction angle width, a previous-time elapsed time from a present-time elapsed time, the previous-time elapsed time being the elapsed time at the previous timing, the present-time elapsed time being the elapsed time at the present timing, and adding a subtraction result multiplied by the divided section number to the present-time elapsed time, the divided section number being a value of the reference angle divided by the prediction angle width, and predicts the predicted time based on the calculated predicted elapsed time.

13. The traction motor control apparatus for a vehicle according to claim 1, wherein the prediction angle width is a value of the reference angle divided by m (m being an integer larger than or equal to 2).

* * * * *